(12) United States Patent
Faqih

(10) Patent No.: US 6,684,648 B2
(45) Date of Patent: Feb. 3, 2004

(54) APPARATUS FOR THE PRODUCTION OF FRESHWATER FROM EXTREMELY HOT AND HUMID AIR

(75) Inventor: Abdul-Rahman Abdul-Kader M. Faqih, Makka (SA)

(73) Assignee: Fakieh Research & Development Center, Makkah (SA)

( * ) Notice: Subject to any disclaimer, the term of this patent is extended or adjusted under 35 U.S.C. 154(b) by 183 days.

(21) Appl. No.: 09/788,370

(22) Filed: Feb. 21, 2001

(65) Prior Publication Data

US 2002/0046569 A1 Apr. 25, 2002

Related U.S. Application Data

(63) Continuation of application No. 09/625,726, filed on Jul. 26, 2000.

(51) Int. Cl.⁷ .................................. F25D 17/06

(52) U.S. Cl. .............................. 62/93; 62/272; 62/285; 62/389

(58) Field of Search .................. 62/93, 272, 150, 62/291, 288, 285, 3.4, 271, 389, 391, 390

(56) References Cited

U.S. PATENT DOCUMENTS

| | | |
|---|---|---|
| 3,675,442 A | 7/1972 | Swanson |
| 3,748,867 A | 7/1973 | Bel Hamri |
| 3,777,456 A | 12/1973 | Lund |
| 4,050,262 A | 9/1977 | Mehnert |
| 4,080,186 A | 3/1978 | Ockert |
| 4,146,372 A | 3/1979 | Groth et al. |
| 4,148,617 A | 4/1979 | Clark |
| 4,163,373 A | 8/1979 | van der Sluijs |
| 4,185,969 A | 1/1980 | Bulang |
| 4,197,713 A | 4/1980 | Bulang |
| 4,219,341 A | 8/1980 | Hussmann |
| 4,240,814 A | 12/1980 | Regehr et al. |
| 4,255,937 A | 3/1981 | Ehrlich |
| 4,256,472 A | 3/1981 | Atkins et al. |
| 4,285,702 A | 8/1981 | Michel et al. |
| 4,299,599 A | 11/1981 | Takeyama et al. |
| 4,304,577 A | 12/1981 | Ito et al. |
| 4,344,778 A | 8/1982 | Matsuoka et al. |
| 4,351,651 A | 9/1982 | Courneya |
| 4,365,979 A | 12/1982 | Takeyama et al. |
| 4,377,398 A | 3/1983 | Bennett |
| 4,418,549 A | 12/1983 | Courneya |
| 4,726,817 A | 2/1988 | Roger |
| 4,892,570 A | 1/1990 | Littrell |
| 5,039,407 A | 8/1991 | Mohrman |
| 5,056,593 A | 10/1991 | Hull |

(List continued on next page.)

Primary Examiner—Harry B. Tanner
(74) Attorney, Agent, or Firm—Nixon Peabody LLP; Donald R. Studebaker

(57) ABSTRACT

Systems and methods are disclosed for extraction of freshwater from ambient air in regions of extremely hot and humid climates, for supply of drinking water and freshwater for small to large groups of people in remote and isolated areas or wherever freshwater resources are not conveniently accessible. Compact mobile units are disclosed to provide freshwater and drinking water for resort areas, to passengers on land and sea vehicles, in situations of emergency, and to areas of water shortage. The art of adaptation of commercial dehumidification units is taught in design and construction of apparatus for production of freshwater and drinking water. Preparation of drinking water included ultraviolet disinfection, ozone treatment, and/or chlorine addition; activated carbon and ion exchange filters; and adding of fluorine, air/oxygen to refresh the water storage units, and minerals for taste and health provisions. For energy economy and use of independent electric power supply, the produced water may flow under gravitational forces entirely or with the assistance of small boasting pumps. Lukewarm, hot, cold, and/or cold carbonated drinking water are provided as well as freshwater for other usage.

54 Claims, 13 Drawing Sheets

U.S. PATENT DOCUMENTS

| | | | | |
|---|---|---|---|---|
| 5,106,512 A | | 4/1992 | Reidy | |
| 5,149,446 A | * | 9/1992 | Reidy | 62/93 X |
| 5,203,989 A | * | 4/1993 | Reidy | 62/93 X |
| 5,233,843 A | | 8/1993 | Clarke | |
| 5,259,203 A | * | 11/1993 | Engel et al. | 62/150 |
| 5,301,516 A | * | 4/1994 | Poindexter | 62/126 |
| 5,517,829 A | * | 5/1996 | Michael | 62/272 |
| 5,553,459 A | * | 9/1996 | Harrison | 62/93 |
| 5,701,749 A | * | 12/1997 | Zakryk | 62/93 |
| 5,846,296 A | | 12/1998 | Krumsvik | |
| 6,029,461 A | * | 2/2000 | Zakryk | 62/93 |
| 6,058,718 A | * | 5/2000 | Forsberg et al. | 62/150 X |
| 6,209,337 B1 | * | 4/2001 | Edwards | 62/93 X |
| 6,237,352 B1 | * | 5/2001 | Goodchild | 62/93 X |

\* cited by examiner

APPARATUS FOR THE PRODUCTION OF FRESHWATER FROM EXTREMELY HOT AND HUMID AIR

BACKGROUND OF THE INVENTION

1. Field of the Invention

The invention relates generally to a water system for first condensing water vapor from the atmosphere, subsequently collecting the condensate to supply freshwater, treating the freshwater and dispensing potable water in areas suffering from shortages of freshwater wherein the climate is characterized by extended periods of extremely high temperature and very high humidity.

2. Summary of the Invention

Freshwater is needed everywhere at all times for sustenance of any form of life on earth. Potable water is necessary for survival of human kind. Continuous supply of freshwater is required for other vital uses in daily life such as irrigation and cultivation of land, drinking of domesticated animals and birds, cleaning, washing, and preparation of foods and drinks. This is in addition to the role of fresh water in driving the wheels of industry and generation of electricity. While several forms of natural freshwater resources are available, they are limited and not readily within reach for direct use of people everywhere. In fact, disputes over water rights and wars for rights to access freshwater are expected to escalate in the near future.

In the past, people searched for locations to settle wherever freshwater sources were conveniently accessible, nearby rivers or lakes, and around locations of abundant groundwater or within regions of sufficient rainfall. Whenever water resources dwindled or became scarce, they moved on to develop new settlements where they had easy access to ample supply of water. As the earth became heavily populated, fertile and water-rich land became overcrowded and eventually communities had to settle in regions of limited water resources. Furthermore, change in weather patterns has reduced rainfall in some areas and deserts started to creep in as water resources were depleted, while the inhabitants had no recourse but to stay.

Accordingly, means are needed to supply water from available water resources that may not be readily accessible. Examples are transportation of potable water sources located further away from population centers; tapping in sources of water that require little to extensive treatment before use for human consumption; and employment of proven technologies to produce freshwater from raw water, such as salty or contaminated groundwater, high salinity seawater, or contaminated water from rivers or lakes.

People have long relied upon underground water as a source of continuous water supply, however, increases in industrial and agriculture activities have led to its rapid depletion as well as contamination of that valuable water resource. Rivers and lakes are not capable of meeting local demand on water in some regions and are polluted in other regions. Furthermore, the inevitable shift in global weather patterns throughout time resulted in scarcity of water in populated areas that previously enjoyed plentiful supply of freshwater. In some areas people lost access to any local surface or ground water sources of water. Because of these shortages, vast areas of land are entirely deprived from natural freshwater resources, thus, water has to be transported across long distances and at very high prices, whether for the capital cost of the infrastructure or the extensive expenditure on land or sea transportation. This is compounded by the high potential of water contamination en route.

For areas along the shorelines of oceans or seas, or wherein brackish groundwater is available, water desalination has been used wherever feasible by means of flash desalination, reverse osmosis, electrodialysis, or ion exchange depending on the salinity level and the economics of different raw water treatment technologies and their future development. Furthermore, there are emerging technologies for treatment of polluted or contaminated underground water resources, rivers and lakes, however desalination and other treatment technologies are economically viable only at large production scales that require huge installations, complex distribution systems and a large customer base to exploit the economy of size. As a result, this limits the implementation of such approaches to securing the water supply to large population centers wherein the demand on water is increasing and the consumption is already high.

Generally, natural freshwater resources are limited in regions along the shorelines and within the vicinity of large salty water bodies that are characterized by extremes of high temperature and high humidity throughout the year. Such regions often have low precipitation year around and groundwater is also limited due to lack of rainfall to replenish the water resources, difficulty to grow plants and trees that aid in precipitation of atmospheric water, and absence of forests that contribute to the natural water supply from fog. The fast rate of consumption of underground water leads to depletion of the water stored in the natural aquifers and to a lowering of the water table associated with an increase in the salinity of groundwater. Agricultural and industrial activities, even at a large distance from the site where freshwater is scarce, have led to contamination of underground water everywhere through their emission of insecticides, herbicides and a host of other toxic chemicals.

Water economy strategies may reduce the water demand but any water conservation measures will not be sufficient to supply areas deprived of any type of water resources. Potential reuse of wastewater after treatment may supply a portion of the water demand, although in some situations the cost of processing, filtration and purification may be prohibitive.

In spite of the vast progress in water treatment technology and the ability to supply people with freshwater anywhere at any time, there are situations in which it is practically impossible to economically provide some population centers with freshwater in a manner compatible with local water demand and daily needs. Vivid examples of the difficulty to access good quality drinking water are numerous. Inhabitants of population pockets in the African deserts are forced to drink water with high salt content and harsh taste. Bedouins suffer from scarcity of water for drinking and for raising their sheep. Dwellers of rural regions, remotely located settlements and scattered low population areas have great difficulty accessing a reasonable supply of freshwater for drinking to maintain there health and well being and to sustain the sparse agriculture activities that provide them with food supply.

Accordingly, there is an urgent need in the art for simple and low cost water systems to supply freshwater to sparse population centers in remote areas that are isolated from metropolitan regions; especially those population pockets that have no access to municipalities or the main supply of water for large cities. These water systems should be easy to operate and require minimal or no maintenance. Since most of the potential users have no access to any central electric power services, electric power requirements should be limited and are preferably delivered by small mobile electric power generators that do not require a connection to electrical power grids or a supply of local electricity.

With the continuous development of water desalination and water treatment technology, relatively small units have been designed and manufactured to supply potable water for limited groups; such as the skid mounted and truck-mounted reverse osmosis (RO) units currently employed by the U.S. Military. However, such units are costly in maintenance, require frequent replacements of RO membranes, consume large quantities of electric power and are subject to frequent outages and repairs. Furthermore, the addition of pretreatment chemicals is necessary and plant design and production require information on the composition of the raw feed water, including salinity and presence of minerals and contaminants. Also, small distillation systems are often used in homes to produce pure potable water from tap water. However, these units as well as other small filtration units require a relatively clean water source. All of the small water treatment units require access to raw water resources.

Accordingly, there is a need in the art for simple and small, low cost, minimal maintenance, easy to operate devices for supplying drinking water sufficient for a small group of people when raw water supply is not readily available due to high salinity or contaminated water resources.

Water resources are not limited to rainfall, snow, underground aquifers or surface water. Atmospheric moisture is an alternative renewable water resource. The water density in the air or the absolute humidity near the surface of the earth ranges between four (4) and twenty-five (25) grams of water per cubic meter of air. While humidity of the ambient air in crowded and populated area can reach up to ten (10) grams of water per cubic meter of air, the absolute humidity in regions located near ocean and sea shores often reach the upper limit of twenty-five (25) grams of water per cubic meter of air.

In reality, ambient air in any habitat, even in areas of relatively dry air, contains an appreciable amount of water vapor since human, animals, birds, plants and all other living beings require the presence of atmospheric moisture to survive. All living cells contain a high percentage of water. As the ambient temperature rises, the flow of dry air evaporates water from the earth surface until concentration is reached. In hot and arid climates, evaporative cooling is the only method of cooling humans and animals When surface water is not available, water is evaporated from plants and living cells, leading to dryness and dehydration of the cells and inevitable loss of life. Unless replenished by drinking water or other fluids, the loss of body moisture is the prime cause of fatal dehydration in dry regions and deserts. On the other hand, people in humid regions are not subject to the same risk when the water is scarce. The same situation applies to all living beings. Evaporation of water from the skin of humans and vapor release from daily activities of cooking and boiling of water results in a rise of humidity in closed spaces and crowded areas.

Atmospheric moisture is an excellent natural source of water regardless of the amount of water vapor content of the air. The lower layer of the atmosphere surrounding the earth contains over three trillion cubic meters ($3 \times 10^{12}$ m$^3$) of renewable water, which is about one-thousandth (0.001) of the water stored on the entire surface of the earth. By comparison, the daily drinking water consumption of the earth population is about two hundred twelve million cubic meters ($2.12 \times 10^8$ m$^3$), which is a very modest portion of the water entrapped in the atmosphere. Meaning, free atmospheric water that is accessible to all mankind on the earth can satisfy in abundance all of the drinking water needs anywhere and anytime. The atmospheric moisture reserve will not be depleted by excessive extraction of water since the water vapor is continuously replenished by evaporation of surface water and the surface of the mountains and valleys due to the flow of hot air.

Accordingly, there is a need in the art for innovative technologies for extraction of fresh water from ambient air moisture that can supply human needs, where conventional raw water resources do not exist.

High mobility and the rise in travel across deserts and arid lands, whether for military operations, business, or the transport of goods, are associated with complications of access to potable water supply and running the risk of dehydration from unanticipated shortage of water, or the use of water sources that cannot be trusted. Although aboard land vehicles are capable of transporting water tanks that contain sufficient provisions of potable water, they can be inconvenient and would require an accurate estimation of the quantity of the water required for the trip. In addition, heavy water-filled tanks will increase the overall cargo weight of a large caravan.

Accordingly, there is a need in the art for a small mobile water system for supplying drinking water to a small group of people whenever necessary and without the need for ground or surface raw water resources. There is also a need for a small mobile water-producing system for use in land transportation vehicles, and hence, can be mounted on trucks, trailers or passenger vehicles without adding burdensome weight or occupying an extraordinary large space inside the vehicles.

Additionally, continuous supplies of freshwater and potable water containers aboard seagoing vessels such as ships, boats and yachts require installation of relatively large freshwater storage tanks, huge systems for seawater desalination and/or wastewater treatment for recycling. The space occupied by water containers aboard seagoing vessels often reduces the space available for cargo or limits the efficient utilization of the space for other beneficial uses.

Accordingly, there is a need for a small mobile system for placement aboard seagoing vessels such as ships, boats and yachts that provides a continuous supply of drinking water.

Furthermore, many popular tourist areas and resorts located in/near arid regions or deserts near seashores often suffer from a shortage of clean drinking water due to minimal seasonal rainfall and brackish underground water. These resort areas are often overcrowded during the tourist season and under-populated otherwise, and hence the great disparity in demand for potable water makes the construction of seawater desalination plants or large water treatment plants a non-economical option. Moreover, the transport of freshwater for distribution in these areas is a costly option and exposes the water to contamination. The reliance of tourists on expensive bottled water represents a great financial burden on the tourists and does not provide for freshwater needs for other uses.

Accordingly, there is a need in the art for freshwater producing systems that supply cabins, cottages and tourism installations with fresh water throughout the tourist season in areas characterized by high temperature and high relative humidity.

Additionally, the water quality in many regions that depend on the supply of water through shipping by sea or land is often below drinking standards as a result of contamination during transportation, loading and/or unloading as well as during storage in local water tanks at the site of use. Using transported water may require minor treatment and protection during storage. This often forces the residents of these regions to resort to use expensive bottled water as a trusted drinking water supply source. However, the collection of atmospheric moisture would reduce the expenditure on water as one of the basic vital commodities in the market, and, depending upon the climatic conditions of the region, may also satisfy other uses of water other-than drinking.

Accordingly, there is a continuous need for relatively large water systems to supply a large population with high quality freshwater in areas deprived from any local sources of freshwater yet having abundant atmospheric water resources.

In addition, great gatherings of people, for example, festivals, pilgrimages, and other popular occasions, may last for short durations ranging from hours to a few days, but often require the shipment of freshwater and potable bottled water across vast distances since they are usually located in limited open areas that are often ill-equipped with plentiful supplies of freshwater. For example, the supply of freshwater to pilgrims during the Hajj season in Mecca is costly and problematic since its desert location is often occupied by more than 2 million peoples whom have little or no local water supply systems.

Accordingly, there is a need for relatively large water systems for supplying a large population for short periods with freshwater and potable water in regions characterized by year-round high temperatures and humidity in place of water transportation. In this situation, the water systems must be capable of extracting water from ambient air without the need for a central electric power supply system, addition of chemicals, or the need for spare parts or maintenance and must be easy to operate with no attendance.

Furthermore, in many emergency situations, especially those caused by natural disasters, water supply systems get contaminated or temporarily shut down for extended periods due to loss of electricity; for example during earthquakes, severe thunder storms, hurricanes, tornadoes, eruption of volcanoes, flashfloods, etc. In such cases, transport of sufficient loads of bottled water or water tanks may be hampered by the destruction of the infrastructure or denial of passage. This is while weather conditions in most of these emergencies are such that ambient air is saturated with moisture.

Accordingly, there is a need in the art for systems to supply drinking water and freshwater during emergencies. Such water systems need to be available upon demand and immediately operable under all weather conditions and should not be subject to accessibility to raw water resources or availability of commercial supply of water, chemicals or spare parts.

3. Description of the Prior Art

Prior art encompasses several inventions that utilize chemical adsorbents to dry atmospheric air or moisture-laden gases. The moisture is extracted as water for use whether as drinking water or fresh water after appropriate treatment. The adsorbent is regenerated and recycled for reuse. The use of adsorbents may be necessary in cases wherein insignificant amount of moisture are present in the atmosphere whereas in the case of extremely hot and humid environments the use of chemicals seems to be a nuisance and would require additional steps for extraction of water and regeneration of the chemicals.

In U.S. Pat. No. 5,846,296, a method is disclosed for recovering and/or purifying water that is absorbed from a humid atmosphere. The moisture from the air is adsorbed on a suitable medium in a defined space, whereupon by the application of heat the moisture is brought to a condenser where it passes into a liquid state and is collected in a suitable manner. In order to improve the efficiency of this method the defined, sealed space is opened for the adsorbing medium, for free access to air at nighttime and is closed during the hot daytime period. Condensed water is passed out through a collecting funnel and a channel to a collection container. A device is also described in the form of a housing with walls that can be opened and closed, in which an adsorbing medium is located. In the upper part of the housing there is provided a condenser. The condenser is equipped with a drop collector that is connected to an outlet pipe to a collection container.

U.S. Pat. No. 5,233,843 discloses a system for extracting moisture from ambient air that includes a desiccant pond for absorbing moisture from the air to produce a water-rich desiccant and a means for vaporizing the moisture in the water rich desiccant. The process encompasses mixing the vaporized moisture with ambient air to increase the dew point of the ambient air, condensing the vaporized moisture to form a potable water condensate and returning the water lean desiccant back to the desiccant pond.

In U.S. Pat. No. 4,726,817, ambient air is canalized and cooled in a free space delimited by a thermally insulated enclosure and a radiating heat exchanger of which the outer face is heat-absorbing and the inner face is heat-radiating. Air is then passed through a curtain of hygroscopic fibers where water vapor condensates into liquid water which is evacuated through a conduit and, once dried, air is heated by flowing at the inside of a radiator recovering thermal energy emitted by the face of the heat exchanger through a transparent thermally insulating volume. Dry air is then exhausted through a vent to the atmosphere. Since air circulates naturally, it is possible to recover, autonomously and without any other energy supply, water contained in vapor form in the atmosphere of the implantation site.

In U.S. Pat. No. 4,377,398, a solid matrix of microporous adsorbent is utilized to provide a barrier between two bodies of a gaseous mixture of which at least one constituent is a sorbable vapor. Appropriate application of heat at the opposing interfaces of the adsorbent barrier produces a partial pressure differential across the barrier. The adsorbent material is energized from a convenient heat source; for example, solar energy. The vapor pump of the invention may be used for environmental refrigeration and may be of the open or closed type. Other uses for the vapor pump are for producing a supply of pure water from low vapor content air or for drying air by removing the vapor content.

In U.S. Pat. No. 4,365,979, a water-producing device was designed for extracting water from moisture-laden ambient air. The device includes: (1) a circumferentially spaced chambers packed with an adsorbent for adsorbing moisture in the air, (2) a driving subsystem for bringing one or more of the chambers into and out of communication with a first and second desorbing section, (3) a subsystem for passing ambient air through the chambers not in communication with the desorbing section, whereby moisture from the ambient air is adsorbed on the adsorbent and subsequently removed from the adsorbent in each chamber as that chamber is brought into communication with the desorbing sections, (4) a recycling duct connecting the post-desorbing section to the predesorbing section to complete a desorption circuit, (5) a subsystem for circulating air through the circuit to remove water from the adsorbent, (6) a subsystem for heating the air in the circuit, and (7) a subsystem for removing water from the circuit. The ratio of the number of chambers in communication with the desorbing sections to the number of chambers receiving moisture-laden air can be varied according to the temperature and moisture content of the ambient air. Other versions of the device are disclosed in U.S. Pat. Nos. 4,344,778, 4,304,577, and 4,299,599, which include a component for adsorbing a moisture in the ambient air in an adsorbent for adsorption or absorption; component for desorbing the water as a steam by heating the adsorbent; component for evaporating a low quality water with a latent heat in the condensation of the desorbed steam; and component for condensing the steam obtained from the low quality water into the liquid water, whereby the water productivity is remarkably improved.

U.S. Pat. No. 4,285,702 teaches a method of recovering water from atmospheric air consisting of two phases: an adsorption phase, during which cool, humid air is transported through a water-adsorbent material for adsorption of water vapor and a desorption phase, during which warmer, drier air is transported through the adsorbent material for pickup of water from the adsorbent material. The desorption phase generates a first air stream in a closed-loop path through a heater for heating the first air stream and then to the adsorber material and back through the heater. Continuing this step for a predetermined time, generates a second air stream by diverting a portion of the first air stream for circulation from the adsorber material through a condenser for yielding water by condensation, and joining the second air stream to the first air stream after passage of the second air stream through the condenser, whereby the second air stream may be heated by the heater and passed through the adsorbent material. Other versions are provided in U.S. Pat. Nos. 4,197,713 and 4,185,969. This method and devices are suitable for cold weather with a trace of humidity.

A plant for the recovery of water from humid air is described in U.S. Pat. No. 4,219,341, in which at night, cool humid air is passed through an adsorbent medium layer which adsorbs water from the air and in which, by day, air heated by solar energy up to a temperature which is above the ambient temperature is passed first through this layer to absorb water from the layer and then is cooled down so that the water condenses. The daytime air, when entering the adsorbent layer, is heated by solar energy with a radiator which is preferably a black anodized aluminum web in which the adsorbent medium may be embedded and/or by the adsorbent medium layer which is colored black for better absorption of sun rays. By using reflectors, the solarization upon the adsorbent medium layer and/or the radiator may be intensified. An earlier version of the device was also described U.S. Pat. No. 4,146,372.

U.S. Pat. No. 4,163,373 disclosed a device for extracting moisture from a space. A refrigerator is provided with a continuous length of capillary material that extends via an opening in the refrigerator wall into contact with an evaporator in an enclosed evaporator space and with an externally disposed condenser. A hygroscopic liquid is contained in the continuous length of capillary material for absorption of moisture in the evaporator space and for elimination of moisture outside the refrigerator wall. The two ends of the continuous length of capillary material are arranged in liquid-transmitting contact with each other so that the hygroscopic liquid flows in a closed circuit.

The aforementioned inventions do not relate to the present invention since they are based on the use of adsorbents, desiccants and hygroscopic material, and mostly address low humidity climate conditions.

Prior art has also encompassed water extraction of freshwater from the atmosphere using processes that rely upon heat convection in large structures. For example, a water precipitator was designed in U.S. Pat. No. 4,892,570 to provide a water supply over an extended surface area of land in a high temperature region by condensing water on piping chilled by a refrigerant circulating within the piping. The water precipitator comprises a combination of a refrigeration system constructed from coils of metal piping connected at one end to a tank filled with Butane and connected at the other end to an empty tank for condensing hot air into water; a structure for capturing the hot air irrespective of wind direction and which relies on convection to move the hot air past the refrigeration system; air intake device consisting of a series of air intake flaps that are activated, to the open or closed position, solely by the dynamic pressure of the incoming air for permitting hot air to enter into the structure.

U.S. Pat. No. 4,080,186 describes a device to extract useful energy and fresh water from moist air, with an associated removal of pollutant particles entrained in the extracted water. The device comprises an enclosure with a tall stack and an extended base that has means for the creation and utilization of a contained tornado, which is powered by the energy release associated with the rapid condensation of water from the incoming moist air. This patent is based on atmospheric conditions that do not pertain to the present invention.

In another invention, U.S. Pat. No. 4,050,262 discloses a device for extracting water from the atmosphere that has a chamber or a pair of chambers connected to a compressor by a valve controlled in its operation in response to an operating condition in the chamber or chambers. A suction fan is connected to the chamber or chambers to move air through the chambers. A further valve is arranged in the respective inlet to the chamber or chambers to facilitate an expansion condition or effect in the respective chamber. Two chambers are used to operate in alternate fashion so that heat is supplied to one chamber while heat is being withdrawn from the other chamber and vice versa and both chambers are controlled in response to the respective operating condition. In a similar arrangement, U.S. Pat. No. 4,148,617 discloses a device for recovering water from ambient air having two chambers. In one chamber a pressurized air stream is heated and in the other chamber another pressurized air stream is cooled after which the two air streams are mixed resulting in condensation of the moisture contained in the air streams which is then collected and put to use.

In U.S. Pat. No. 3,777,456, water is extracted from the atmosphere by circulating a large volume of a solution of lithium chloride in water continuously over a packing, resulting in absorption of water. The solution is bled off and passed through a desalination plant, where product water is produced. Concentrated brine is returned to the circulating volume.

In U.S. Pat. No. 3,748,867 a device was designed to obtain fresh water from moisture containing air, using an elongated flexible tube with its upper end attached to a lighter-than-air balloon, preferably in the form of a non-rigid airship (blimp). The length of the tube is sufficiently great to extend from about ground level to a temperature zone having a climatic condition in which the temperature or moisture distribution of the atmosphere is sufficiently different from that at ground level. This permits, either, condensation of moisture as moisture-containing atmosphere conducted upwardly into the tube or introduction of seed crystals, such as silver iodide, into the atmosphere to cause precipitation. In the first case, the tube is preferably terminated at its lower end at an opening spaced a short distance above a large body of water, such as an ocean, and maintained on floats or pontoons located in the sub-tropical or tropical regions. Moisture-laden air from the ocean is drawn into the tube so that water only will condense on the tube walls, at the upper atmospheric reaches, to be drawn off and collected. In the second case, when seed crystals are to be introduced, the tube is preferably mounted on an automotive vehicle for wide dispersion of seed crystals.

A freshwater cooling bath is provided in U.S. Pat. No. 3,675,442 for obtaining potable water from moisture-laden air. A mechanical refrigeration system intermittently cools the fresh water bath. A conduit permits the fresh water in the bath to flow to and from a specially designed housing that channels a flow of moisture-laden air. Vertically aligned condenser filaments are positioned within the housing and connected to the conduit to provide condensing surfaces at a temperature below the dew point of the air in the housing. Distributing means are provided for either directing the condensed water, depending on its temperature, to the bath, or for directing the condensed water from the apparatus as output water.

The above inventions that rely upon heat convection in large structures in extraction of freshwater from the atmosphere do not relate to the present invention, which is based on processes that are performed within compact structures.

In addition, the prior art includes simple devices for extraction of potable water from humid air; such as U.S. Pat. Nos. 4,418,549 and 4,351,651 that teach the design of a device for extracting potable water from moisture-laden air at atmospheric temperature through the use of a heat exchanger at or near subsurface temperature, which is in air communication with the atmosphere for allowing atmospheric moisture-laden air to enter, pass through, cool, arrive at its dew point, allow the moisture in the air to precipitate out, and allow the air to pass outward to the atmosphere again. Suitable apparatus may be provided to restrict airflow and allow sufficient residence time of the air in the heat exchanger for sufficient precipitation. Further, filtration is provided on the air input. A movement pressure is created by a turbine on the output. The water from the system may then be collected and provided for human consumption in a conventional manner. The present invention does not use a heat exchanger for precipitation of atmospheric moisture.

Heat pipes are used in some inventions to cool a condensing surface to dew point to precipitate the water vapor from the atmosphere. An example is U.S. Pat. No. 5,553,459, which discloses an invention of a device for obtaining potable water from the ambient air, comprising (1) a compressor for compressing a refrigerant; (2) a condenser for condensing the refrigerant received from the compressor; (3) an evaporator coil for receiving at one end compressed refrigerant from the condenser and being disposed in a water tank wherein the evaporator is operable for evaporating refrigerant and thereby cooling the potable water in the water tank; (4) drip coils for condensing the potable water from the ambient air with the cooled potable water from the water tank passing through the drip coils before returning to the water tank; (5) a fan for blowing ambient air about the drip coils and the condenser; (6) a discharge device connected to the drip coil; (7) a pump for pumping water through the drip coils and the discharge device; (8) a filter and ultra-violet light source for sterilizing the potable water; and (9) a non-toxic coating is provided and disposed on the interior of the drip coil and the exterior of the evaporator, with the non-toxic coating comprising 25 to 35 percent titanium oxide.

Similarly, U.S. Pat. No. 5,517,829 teaches of a device for producing filtered drinking water. Water vapor in the atmosphere is condensed on a condenser surface, which is cooled either by a standard refrigeration system or by a thermoelectric system. Condensate water is treated by filtration and by the addition of a disinfectant, and the treated water is stored in a holding tank. Auxiliary water from a local source is treated similarly in a parallel system and stored in a second holding tank. As it is pumped from holding tank to a dispensing tap, treated water passes through a second water treatment, which filters pyrogens and other bacterial residue from the water, and removes residual disinfectant.

U.S. Pat. No. 5,301,516 discloses an improved potable water collection apparatus contained within a housing, for the collection of potable water from a dynamic airflow extending between inlet and outlet ports. A compressor is mounted within the housing to circulate a refrigerant fluid in a closed loop circulation system between the compressor, a condenser coil and a cooling coil. The condenser coil and the cooling coil are mounted in the dynamic airflow extending between the, inlet and outlet ports. A water collection pan is located beneath the cooling coils to collect condensation, which forms as water droplets on the outer surface of the cooling coils, and directs the collected water droplets into a suitable water collection container. A water filter is disposed between the collection pan and the container. A liquid level sensor stop's the operation of the compressor when the water in the collection container reaches a desired level. A temperature and/or pressure sensing valve mounted between the condensation coils and the cooling coils is used to optimize the flow of refrigerant fluid through the closed loop system. A cleaning access member is positioned to selectively provide access to the cooling coils and the collection pan when the apparatus is not in operation. A movable panel member is selectively positioned in a closed position between the cooling coil and the condensation coil for ease of cleaning.

A device was introduced in U.S. Pat. No. 5,259,203 for extracting potable drinking water from moisture-laden atmospheric air using a refrigeration system. A compact housing contains a compressor, an evaporator unit, fan unit, condenser unit, and a reservoir, which may contain a secondary evaporator unit and condenser unit. The fan pulls a stream of atmospheric air through a filter and through the evaporator to clean and cool the air and exhausts cooled air through the condenser. The water is collected as condensation by the evaporator and directed to the reservoir through a filter system and a water seal. The reservoir may have separate compartments for holding cool or warm water. The secondary evaporator is submersed in the cool water compartment for cooling the water collected in the reservoir and the secondary condenser is submersed in the warm water compartment for heating the collected water. Operation of the system is controlled by a control module that may also contain a microprocessor for assuring maximum condensation and a removable integrated circuit program module to alter the operation for specific conditions. A humidistat may also be provided to maximize efficiency of atmospheric condensation throughout various times of day or night and in various climates.

Inventions using heat pipes to cool condensing surfaces to dew point to precipitate the water vapor from the atmosphere differ from the present invention in the use of heat pipes.

Several rearrangements were made for extracting water from water vapor-rich environment when it reaches near the saturation point. However, those situations are not limited to atmospheric moisture, but could include water vapor in gases. In U.S. Pat. No. 4,256,472, a mist filter is disclosed for extracting moisture from the humidity-laden outlet air traversing through the evaporator of an automobile or other air conditioner. The mist filter comprises a pair of corrugated screens, with the corrugation of each screen being arranged perpendicularly with the corrugations of the other adjacent screen, a pair of said screens being fastened together, and arranged contiguously with the evaporator of the air conditioner.

A droplet separator for removing drops of liquid from a gas stream is disclosed in U.S. Pat. No. 4,240,814. The separator comprises a stack of corrugated plates each of which is generally planar but has corrugations formed by alternating crests and troughs of given wavelength and amplitude. The troughs of adjacent plates register with one another to define flow passages for the gas stream extending generally in a flow direction between the inlet and outlet sides of the stack. The crests of adjacent plates contact one another between the flow passages and each of the flow passages is formed with at least two bends in the plate plane effecting direction change in the gas flowing. The corrugations are all of trapezoidal cross section.

Electrostatic and magnetic fields are used to substantially enhance water product extraction yields in a dehumidifying heat exchanger apparatus. In U.S. Pat. No. 5,056,593, dehumidifying heat exchanger apparatuses are disclosed in several variations, which may economically condense and separate a potable water product from a humid air stream. Liquid water droplets are electrostatically collected on grounded or charged heat transfer tubes in the heat exchanger apparatuses. In one variation, charged or grounded horizontally-declined heat transfer tubes with attached drainage wicks attract liquid droplets and accelerate condensing heat transfer by continuous absorption and transfer of condensate. Both cascading liquid droplets and aerosol injection of fine liquid droplets may be used to provide convenient seed nuclei for condensing attachment of water vapor molecules in other variations. Water vapor molecules may be electrostatically stabilized in a polar orientation between charged electrodes and oppositely-charged or grounded heat transfer tubes, then impelled by magnetic forces onto heat transfer surfaces as a thin condensing film. A simplified closed cycle heat transfer system is disclosed which may economically reject condensing heat to atmosphere. The heat exchanger apparatuses may operate with considerable energy economies, since substantial moisture separation may occur without any need to cool an entire air stream to below local saturation or dew point temperatures. Forms of the invention may collect potable water from humid air in water-short regions, dehumidify air in air conditioning apparatuses, separate out condensable vapor pollutants in air pollution control equipment and separate condensable vapors from gaseous fluids in chemical processes.

A water-generating device was disclosed for obtaining portable water from ambient air inside or outside a structure or dwelling in U.S. Pat. No. 5,203,989, 5,149,446 and 5,106,512. The components of the device include an air filter; a condenser for extracting water vapor in the air; an immediate temporary holding reservoir, which contains an ultraviolet light to kill existing microorganisms; a pump to transport the water through a subsequent water filter for a second exposure to ultraviolet light. At the final discharge point to the internal or external water-storage unit there may be another ultraviolet light that creates a sterile outlet from the primary system.

U.S. Pat. No. 4,255,937 reports an atmospheric water collector that collects water from the atmosphere by providing a portable cabinet in which the entire apparatus is located, needing only a source of electricity. A dehumidifier is located in an upper compartment separated by a horizontal partition from a lower compartment. In the upper compartment, two opposite walls are perforated to provide access of new moisture carrying air to circulate about the dehumidifier, and a water discharge spout is also located above the horizontal partition, but is outside the dehumidifier compartment. Water feed conduit from the dehumidifier leads to a water-collecting tank in the lower compartment, passing through a water filter on its way. A ultra-violet light bulb sterilizes the water in the tank. A water level control in the collecting tank controls the operation of the dehumidifier. A water pump controlled by a combination water discharge spout and pump switch pumps the water to the spout, up through a check valve and another filter. A complete electric refrigerator is also included with the cabinet for keeping the water cool and drinkable.

U.S. Pat. No. 5,039,407 provides a water reclamation and collection unit to collect exterior moisture in any form from the atmosphere and process such moisture converted to water to a chemical state where it is potable for humans or animals. The unit processes water to a cleansed and sanitized condition that will allow such water to be used for any purpose within any facility inhabited by people. The total unit process is designed to provide sufficient water to sustain the needs of persons in a facility without the need to use water from a well, public water distribution system or any other type surface water supply. The unit may be used for all purposes except, flushing toilets or fixtures used for depositing human waste.

None of the prior art references discloses the use of gravity to support the flow of water throughout a device for extraction of water from atmospheric humidity to produce potable water. Additionally, none of the prior art discloses the production of drinking water containing minerals adjusted to the taste and the health needs of the user, and, dispensing the potable water as hot, cold, or cold carbonated water. The prior art also fails to disclose diverting of the accumulated water into a separate filtered freshwater stream. Furthermore, none of the prior art inventions disclose means for diverting the flow of the accumulated water from the main storage tank in excess of its capacity for use or for disposal. In addition, none of the prior art inventions disclose disinfecting the water condensate in a cold storage and the production of lukewarm water.

According to the present invention, a gravity-driven system is disclosed for condensing water vapor from high temperature, high humidity ambient air through the use of: a commercial dehumidifier, means for collecting the condensate, an ultraviolet disinfecting and filtration device, a water storage device and a dispenser for dispensing a product of potable water upon demand. In a second aspect of the invention, a system is disclosed for condensation of atmospheric humidity by a variety of condensation units. Alternate water treatment provisions included ultraviolet radiation ozonation, chlorination, and the addition of fluorine and minerals to the product water. The water storage is aerated to clean the water supply, and water is dispensed as warm, cold and cold carbonated water, using small pumps in addition to gravity to assist in water flow. In a third aspect of the invention, a horizontally arranged system is disclosed to extract water from ambient air for mounting on land or sea vehicles and platforms. In a fourth aspect of the invention, specially designed condensation surfaces are disclosed to enhance water production from atmospheric air in regions of extremely high temperature and very high humidity.

It is an object of the present invention to provide an apparatus, utilizing conventional dehumidifiers for condensation of water vapor from ambient air indoors to supply freshwater and disinfected water suitable for drinking to small dwellings and homes of different sizes and living spaces, in regions of extremely high temperature and high relative humidity.

It is another object of the present invention to provide an apparatus, utilizing conventional dehumidifiers for condensation of water vapor from ambient open-air outdoors to supply freshwater and disinfected water suitable for drinking to a group of people, in regions of extremely high temperature and high relative humidity.

It is a third object of the present invention to provide a small, light weight apparatus of limited capacity to collect water vapor from hot humid ambient air, indoors or outdoors to continuously provide people with freshwater and drinking water through gravitational flow of the product water from conventional dehumidifiers.

It is a fourth object of the present invention to provide a small, light weight apparatus of limited capacity to collect water vapor from hot humid ambient air, outdoors to continuously provide people in remote areas and sparse population with freshwater and drinking water through gravitational flow of the product water and minimal electric power requirement, using a standalone power source.

It is a further object of the present invention to provide a complete integrated device for extraction of water from the atmosphere in hot and humid regions; by appropriate condensation surfaces and cooling cycles, using pump assisted water flow, to continuously provide people anywhere with freshwater and high purity potable water.

It is a still further object of the present invention to provide an apparatus for production of water from atmospheric humidity using a condensation surface optimized for maximum production of freshwater.

It is a still further object of the present invention to provide an apparatus for production of water from atmospheric humidity; to supply aerated drinking water with agreeable taste, in one or more of three states, cold, warm, or carbonated and cold.

It is a still further object of the present invention to provide an apparatus for production of water from atmospheric humidity; to supply drinking water free from microbes, bacteria, volatile organic material, harmful suspended or dissolved solids, of a quality higher than local and world standards of pure drinking water, and yet contains beneficial minerals present in typical natural water.

It is a still further object of the present invention to provide a portable apparatus to collect water vapor from ambient open air to continuously provide people with potable water upon demand whether outdoors or aboard land or seagoing vehicles.

It is yet a further object of the present invention to provide a small, lightweight mobile apparatus of limited capacity that can be transported from one place to another to collect water vapor from hot humid open air to provide people with freshwater and drinking water upon demand using pumps and controls.

It is a still further object of the present invention to provide a complete, integrated small, light weight apparatus of limited capacity to collect water vapor from indoor or outdoor ambient air to continuously provide freshwater and high purity potable water in one or more of three states hot, cold, or warm with added beneficial minerals.

It is a still further object of the present invention to provide an apparatus for extraction of atmospheric humidity wherein treatment of freshwater is accomplished by two stages of disinfection using ultraviolet radiation and two stages of filtration of suspended solids.

It is a still further object of the present invention to provide an apparatus for extraction of atmospheric humidity wherein treatment of freshwater is accomplished by ozonation and two stages of filtration of suspended solids.

It is a still farther object of the present invention to provide an apparatus for extraction of atmospheric humidity wherein treatment of freshwater is accomplished by chlorination and two stages of filtration of suspended solids.

It is a still further object of the present invention to provide an apparatus for extraction of atmospheric humidity wherein fluorine is added to the drinking water for the benefit of the consumer.

It is a still further object of the present invention to provide a mobile apparatus for extraction of atmospheric humidity to supply resorts with freshwater and drinking water upon demand.

It is a still further object of the present invention to provide a mobile apparatus for extraction of atmospheric humidity to supply freshwater and drinking water upon demand in situations of emergency.

In a first embodiment of the invention, an apparatus utilizes an adaptation of commercial indoor dehumidifiers, which are normally used to dry indoor air and direct the condensate to a drain in a container for eventual disposal. The smallest device can produces on the average no less than thirty (30) liters per day of pure water in a weather characterized by extremes of high temperature and high relative humidity day and night and all year around. The quantity of potable water is equivalent to the amount of water to be drained from a dehumidifier with the same capacity operating continuously in a hot and humid closed space. Larger capacity space dehumidifiers are commercially available and hence implementation of units of higher capacity is possible. Furthermore, dehumidifiers provide heat transfer surfaces for condensation of water vapor in the air and hence other means of vapor condensation can be used.

The drained water is disinfected, filtered, and stored for dispensing on demand. The orientation of the components is such that the product water flow is completely accomplished by gravity from collection to supply of water to the consumer.

The apparatus resembles a commercial water cooler fountain; such as those used in offices, dispensing water at ambient temperature. The height of a unit; assembled in a cabinet, is almost one and a half times the height of a standard cooler due to the location of the dehumidifier on the top of the water holding bottle. Unassembled, the unit can have different orientations as long as dispensing drinking water is convenient and the flow is maintained vertically. Lateral placement of the components on a kitchen counter or a table would require the use of water pumps, which requires additional electric power over that required for the dehumidifier.

Lower quality freshwater can be drawn for human use other than drinking by elimination of the water treatment stage, that is disinfection and possibly filtration depending on the location of the apparatus, which can be used indoors or outdoors.

Since the capacity of the freshwater storage in the water-producing system is limited, in the second embodiment of the apparatus treated freshwater is directed to fill an additional secondary closed storage tank and through drainage of excess production by gravity to an external open tank. One of the streams can be used for filling large removable water bottles for use in water coolers and the like. Excess product water may be used to fill potable water bottles by gravity for use away from the system location including the use for office coolers and water dispensers.

In the third embodiment of the invention, a bypass for untreated fresh water is incorporated to provide lower quality freshwater for different uses of water other than drinking.

Although outdoor air drying equipment is not commercially familiar; however such devices as well as indoor dehumidifiers can be used for condensing outdoor water vapor from ambient air for supply of potable water through appropriate modifications. This would facilitate the use of the water-producing device in the open air whether outside buildings or on board of transportation vehicles including land vehicles or boats and seagoing ships. This is because the size of the system is relatively small, lightweight and has small footprint. In the same time, the simple device may be equipped for continuous operation to collect water and process it to supply drinking water and/or freshwater. The system can be powered by mobile power sources.

Disinfection of product water in smaller systems can be accomplished by ultraviolet radiation emitted by small radiation sources. In larger systems, alternate disinfection and multiple filtration stages may be used. The drinking water has to be free from microbes, bacteria, volatile organic material, harmful suspended or dissolved solids, and of a quality equivalent to, or higher than local and world standards of pure drinking water. The taste of the water can be adjusted to be agreeable to the taste of the consumers by adding minerals to the product water to provide them also with the required minerals present in typical natural water.

In a second aspect of the invention, different condensation units can be used ranging from conventional refrigerant cycles to thermoelectric and thermo-acoustic refrigeration units as well as cooling condensation surfaces with cold water if a source of cold water is available. In addition, water pumps are used to assist water flow by gravity in the apparatus. In one of the embodiments of this aspect of the invention, two stages of ultraviolet disinfection and two stages of filtration are used in the water-production system. Air or oxygen is pumped in a water storage holding tank for aeration to keep the freshness of the drinking water. The drinking water stream is monitored for mineral content and a solution of natural minerals useful for enriching the potable water is added in controlled spikes to the collected condensate for taste improvement according to the desire of the user. The minerals could be added in the form of strained seawater or a solution of sea salt, rock salt or other available minerals. Before delivery of the water to the user as drinking water, the water is filtered and disinfected to assure that the potable water is free of suspended dust from the air, organic and inorganic contaminants, volatile and dissolved particulates to supply pure water of high quality for drinking through two streams one for cold water and one for warm water. Additional line may be incorporated to provide carbonated water via addition of carbon dioxide.

In an alternate embodiment of the second aspect of the invention, ozonation of the water in the holding tank replaced ultraviolet disinfection and aeration. Chlorination of drinking water and the addition of fluoride were used in a different embodiment to replace the ultraviolet disinfection and to provide additional health benefits.

In a third aspect of the invention, horizontal orientation of the components of the apparatus using pumps, air blowers, and controls allows for extraction of water from atmospheric humidity in different weather conditions and in locating the apparatus aboard land or sea vehicles. The water system can be skid mounted and placed on a trailer or a truck for supply of drinking water to small or large groups in different locations whether on temporary basis or in case of emergencies.

Increase in production capacity of water extracted from atmospheric humidity can be further achieved by design and construction of condensation surfaces for optimal water production, rather than effectiveness in drying ambient air.

DETAILED DESCRIPTION OF THE INVENTION

Figure 1:
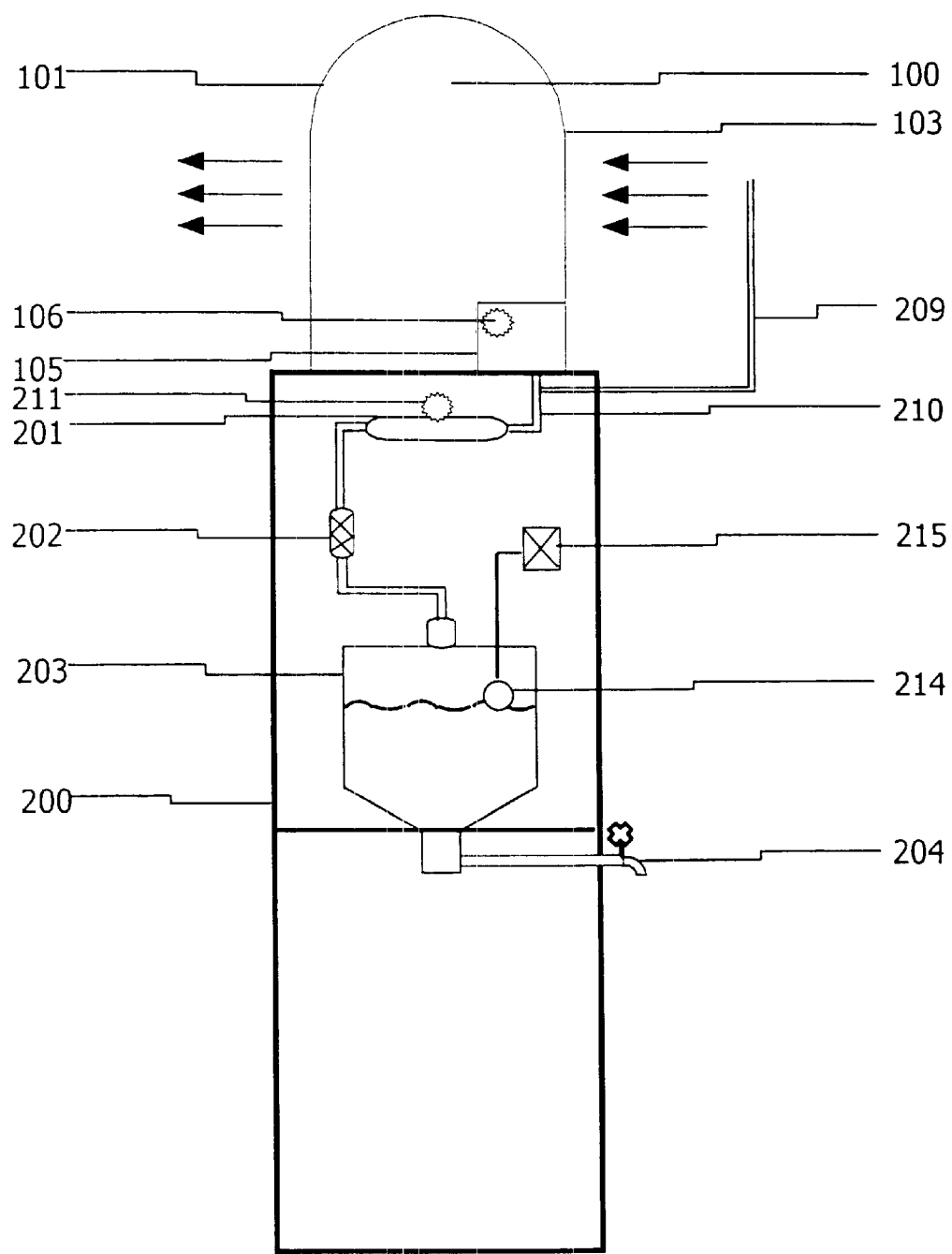
FIG. 1 schematically shows a side view of a simple device for production of a limited quantity of potable water using a commercial indoor dehumidifier, after slight modifications to condensate water vapor entrained in hot humid air. The water flow is completely driven by gravity. The device may stand up as shown or may be placed on a table or a bench at the place of use inside or outside a building.

FIG. 1 schematically shows the components of a simple apparatus for production of a limited quantity of potable water from atmospheric humidity present in hot humid air surrounding all surfaces of the apparatus. The ambient air may be trapped in a closed space and is moving by convection or naturally blowing in an open space at the location of the apparatus. In either case, the surrounding air is at very high temperature and has very high relative humidity. The condensed water flows in the apparatus by gravitational forces alone without the aid of pumps or water lifting devices.

According to the present invention, the apparatus comprises a modified commercial dehumidifier unit 100; such as Kenmore™ produced by Sears™ or equivalent in terms of capacity and performance in removal of humidity from the air. Slight modifications were introduced to the said dehumidifier. The selected type of dehumidifier is normally used to remove humidity from closed spaces; such as a room or a closet in living quarters or a specific space in residential buildings, and is commonly used to reduce the build up of moisture in basements in cold regions. Commercial dehumidifiers are also used to dry the air in a storage area or a shop in factories and commercial buildings. Some manufacturing processes require a dry air environment and hence the humidity of the factory floors and the production facilities has to be kept under a specified limit. The function of dehumidifiers is to dry the ambient air by removal of the humidity in closed spaces by condensation of water vapor entrained in the air and disposal of the extracted water as wastewater and the return of the dry air. In this case, the return air is usually filtered before exiting the dehumidifier to remove suspended dust or pollutants before returning to the atmosphere. Air filtration is accomplished in the same manner as in air conditioning units before blowing the cold air back in the closed spaces. The capacity of a dehumidifier is selected according to the size of the place (air volume to be dried) and the amount of humidity generated or present in the space, and the objective of air-drying whether commercial, residential or in a factory. Such units are designed to efficiently remove humidity and dry the air and are not optimized to produce water as a product or a byproduct.

Water vapor is condensated in unit 100 by a conventional CFC (Chlorofluorocarbons) refrigeration cycle using a refrigerant fluid such as freon-22 or equivalent. Ambient hot humid air surrounding the apparatus is sucked in by an air blower, directed inside unit 100 through the front duct 103, and forced out after removal of the humidity through the back duct 101. As the hot humid air enters unit 100, it passes by the cold surface of the coils of the refrigerant evaporator (water condenser) that cools the air as it condenses the water vapor in the form of droplets of fresh water that falls by gravity in container 105 that collects the condensate. The dry air flows over the balance of the refrigeration equipment to cool them before leaving unit 100 and exits as dry air at a relatively high temperature.

In an implementation of this aspect of the invention, the surface area of the water condenser in unit 100 was 15.68 square meter, however the invention can be implemented using different dehumidifiers with larger or smaller condensation surface areas, dependent on the capacity of the unit 100. The electric power requirements of the selected unit is typical of the USA, Europe and Japan, that is 110 volt, 60 Hz, and 6.8 amperes; or 220 volts, 50 Hz, and 3.5 amperes. The maximum power consumption is 8 kWh per day for continuous operation.

The outer enclosure of unit 100 is manufactured of hard plastic or artificial wood to protect the cooling equipment and to direct the air in one direction from the front to the back. The container 105 is placed in a cavity at the lower part of the front wall 103 to collect the dripping from the water condenser through a narrow orifice connecting the unit 100 and the container 105. This arrangement or other variations on it is typical of most commercial dehumidifiers wherein the container 105 is used to trap the drainage of the condensed water in order to contain the overflow and water runoff for disposal later on, as the container gets filled. Usually, the dehumidifier operates continuously and stops when the container 105 is filled, and automatically starts when it is empty or partially filled. The operation control is accomplished by a float that senses the water level in the container 105 and actuates a circuit breaker when the level reaches a preset limit. The electric power is automatically connected as the container is returned empty to its place. Alternately, an electronic sensor is placed under the container. As the container is filled, the weight of the water causes the container to press on the sensor and shuts off the dehumidifier. A third approach is to place a pressure sensor on the top of the rear edge of the container. The container tilts forward as it fills applying pressure on the sensor, which shuts off the system until the empty container is returned to its place. The last control method is the one, which was used, in the selected dehumidifier. However, such feature was disabled as part of the modification of the dehumidifier to allow continuous operation without interruption and since such controls are no longer needed because the water is continuously drained from the container 105 to the water processing stage.

The structure of the entire apparatus is customized to fit the place of use inside or outside a building. The dehumidifier may be placed on the top of a shelf while the connection to the water equipment as well as the piping and equipment are freely supported under the shelf leading to the container 203 which can be placed on a table or a counter top in a kitchen. Alternately the dehumidifier may be placed on the top of a specially assembled box 200 to contain and protect the water treatment and collection equipment. The box 200 may be placed on a bench or built tall enough to stand on its own as shown in FIG. 1 to allow easy access to the water faucet 204. The structure of the box 200 comprises a supporting wooden or metallic frame and sides that allow access through a door to the water treatment and storage equipment. In the implementation of the present aspect of the invention, the box was constructed of wood treated to prevent deterioration by humidity and water mist or potential leaks. The box 200 may be constructed from Plexiglas, steel or enforced aluminum.

In FIG. 1, the box 200 contains the water system, which comprises a disinfectant unit 201, a filter 202, a drinking water storage bottle or holding tank 203, and a water faucet 204. The water flows through the system by gravity without the aid of any pumps. However, since the water is flowing in a closed system the water collected in the container 105 flows down through the pipes by equalizing the internal pressure to atmospheric pressure by means of a vent. The vent is provided by a 20-millimeter diameter flexible plastic capillary tube 209 with one end raised above the water level in the container 105 and the other end connected to the tube 210, between the container 105 and the disinfection unit 201. The role of the tube 209 is to provide the pressure required for the flow of water by gravitational forces and prevents the overflow from the container 105.

The disinfectant unit 201 comprises a small closed container wherein the water is exposed to ultraviolet (UV) radiation emitted from a radiating UV source (lamp) 211. The TV radiation is used to eliminate all microorganisms including germs that may enter the apparatus with the air and bacteria that may form in the water during condensation or may be present at the surfaces as water passes from the condenser to the container 105 and through the connecting tube 210. The potential of the presence of microorganisms is high when the apparatus is used in relatively closed spaces wherein air makeup is limited. Ultraviolet sources are available commercially and commonly used for disinfection of water especially in medical applications wherein water has to be pyrogen free immediately before use. The UV source used in the implementation of the invention is Germ-Ex Ultra Violet Sterilizer™ manufactured by Aquacell International, Inc. or equivalent. Similar sources are produced by many companies including Watertech Enterprise, Tai Pai, Taiwan; Trojan Technologies, Inc., Worcestershire, England, UK; or Brewster Water Purification, British Columbia, Canada; or equivalent.

The use of UV radiation in water disinfection has a similar effect as the addition of chlorine; however UV radiation is less complicated and more effective for small amounts of water that are not held in storage for long time. Although UV is effective in removal of microorganisms, bacteria can get into the storage tank 203 and rapidly multiply and other stages of treatment would be required before dispensing of the drinking water to assure its safety. Water sterilization for medical applications would require disinfection immediately prior to dispensing to assure a pyrogenic water product. For long-term storage of drinking water, continuous disinfection is necessary and hence chlorine or a continuous stream of ozone may be required.

The fact that both of the unit 100 and the container 105 are open to the atmosphere the escape of volatile organic contaminants to the disinfection unit 201 and subsequent stages is unlikely. Such toxic particulates are usually present in air whether in a closed or open space.

In FIG. 1, water collected in container 105 flows to the disinfectant chamber 201 and then goes to a filter 202 where it is filtered from any suspended dust, sand or metallic particulates and for removal of any disinfection byproducts. The filter 202 is a column combining active carbon and ion exchange resin. In the implementation of this aspect of the invention, a Britta™ filter, or equivalent may be used. This type of filter is commonly used at home for tap water purification for drinking and use in preparation of food and drinks. Among the commercial filters that can be used are those produced by Omni™, Pur™, and Rubber Maid™, USA.

After disinfection and filtration, product water flows by gravity to the drinking water storage tank 203 where water can be directly supplied to the consumer by drawing the water through the faucet 204. The tank is constructed from an inverted plastic bottle, placed on a wooden shelf The bottle is a typical 20-liter bottle such as those used to deliver bulk drinking water.

To avoid overflow of water during water production, operation interruption methods used in commercial dehumidifiers can be adapted. In the original arrangement, when the container 105 and drinking water storage tank 203 are filled, container 105 tilts forward under the weight of the water. When the upper edge of the back of the container touches and presses against a pressure sensor 106 connected to a circuit breaker, the operation of the unit 100 will be interrupted to prevent overflow and to also save in power consumption. One of the modifications that were introduced on the unit 100 is the elimination of such means of control to prevent overflow and its replacement with a different arrangement for control according to water level in the tank 203. In fact, it is possible to eliminate the container 105 all together and collect the condensate in a larger open container or a pan to be placed directly under the water condenser after removal of all obstacles to allow the formed water droplets to freely fall in said container. Such arrangement will facilitate the flow of water under gravitational forces without the need for the vent 209 and will prevent contamination of the condensate with volatile particulates.

In the preferred embodiment of this aspect of the invention, a float 214 is placed in the drinking water tank to rise when a predetermined water level is reached that may lead to overflow when the container 105 and drinking water storage tank 203 are filled. The float 214 is connected to a circuit interrupter 215 that stops the operation of the apparatus, to prevent flow of the water outside the tank 203 and reduce power consumption.

Figure 2A:
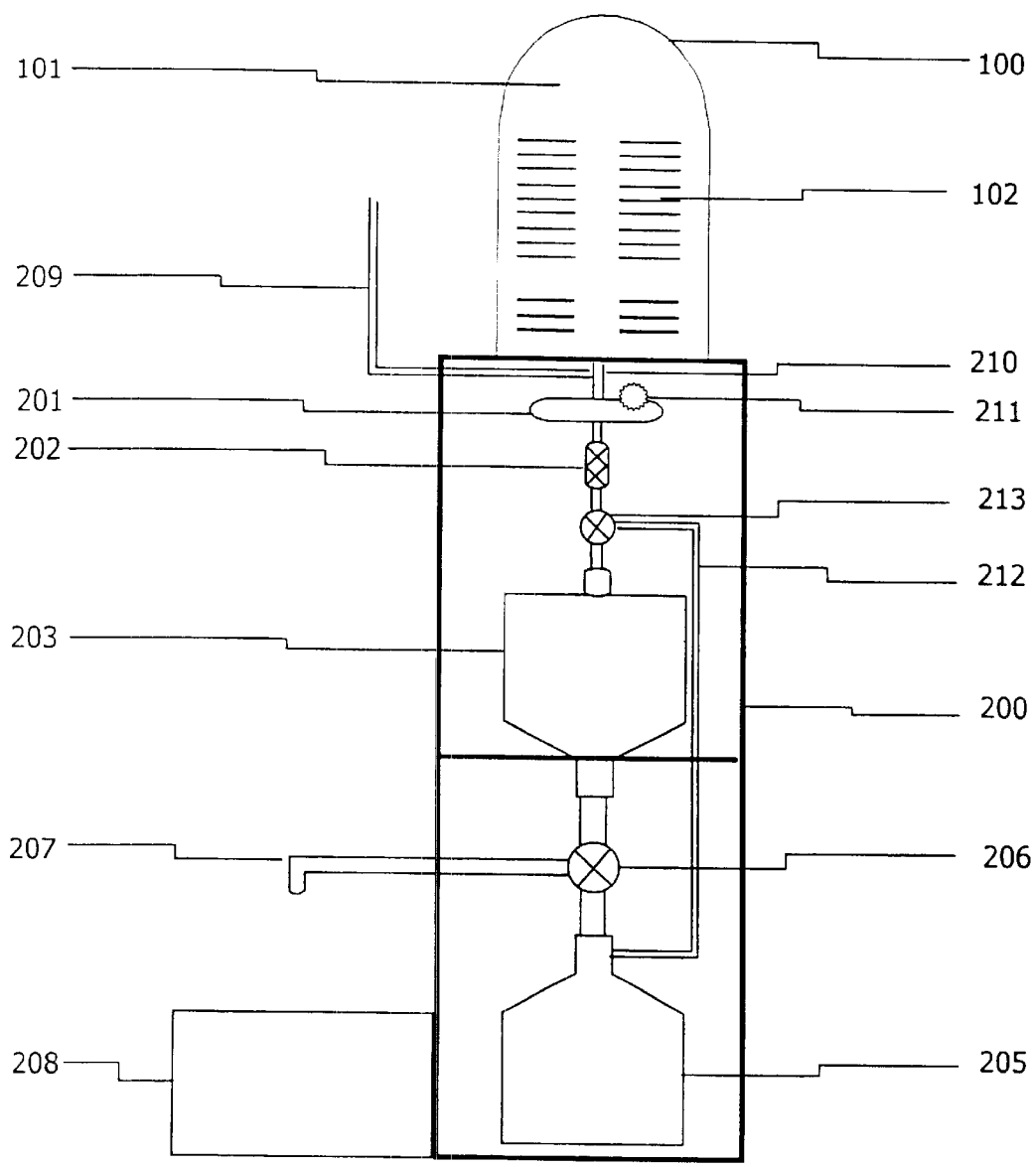
FIG. 2a schematically shows a view of the backside of a simple device for production of potable water from hot and humid air, inside or outside a building, using a modified commercial indoor dehumidifier, wherein the water flow is completely driven by gravity. The device is identical to that shown in FIG. 1 with the addition of extra capacity for increased water production and the introduction of ways to distribute the water product.
Figure 2B:
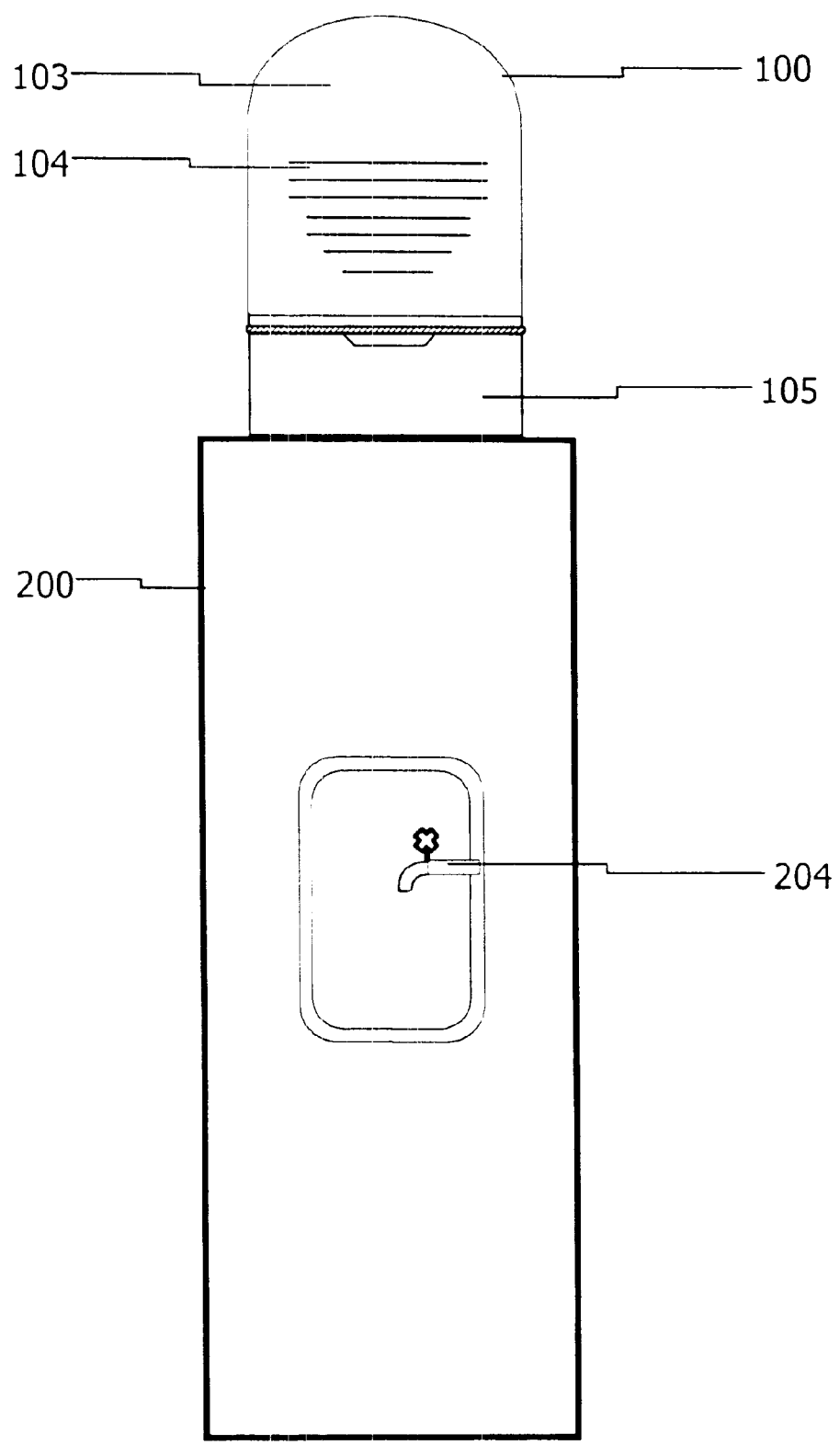
FIG. 2b is a view of the front side of the device of FIG. 2a to show collection of condensate, dispensing of product water and the flow of air through the device.

In a variation of the invention shown in FIG. 1, additional storage is added to take care of the overflow and to increase the holding capacity of the apparatus as shown in FIG. 2. FIG. 2a schematically shows a view of the backside of a simple apparatus that comprises different stages of condensate collection, and product water storage and distribution while FIG. 2b shows a view of the front of the said apparatus. The front side 103 of the unit 100 (FIG. 2b) comprises an air duct 104 that allows hot and humid ambient air to flow through open slots. The incoming hot humid air is directed inside the unit 100 under the suction of an internal fan that draws outside air, blows it over the refrigeration system and forces it out as dry air through an air duct 102 at the back side of the apparatus (FIG. 2a). When the dehumidifier unit 100 is used to dry ambient air in a closed space, an air filter is usually placed on the air duct 102 on the backside of the unit 100 to clean air from dust and pollutants (smoke and volatile particulates) as it returns back dried to the closed space. This is done in the same manner, as is the case in air conditioning units wherein air is filtered before cooling. However, in the case of water production from atmospheric humidity, a filter on the front inlet 104 (FIG. 2b) of the humid hot air is preferred to prevent dust, pollutants and volatile particulates from contaminating the condensate, especially if the apparatus is used in the open air, outside the buildings.

As shown in FIGS. 2a and 2b, the dehumidification unit 100 is fastened to the top of a cabinet 200 with a height that is three times its width. In FIG. 2a the equipment inside the cabinet 200 comprises a water disinfecting chamber 201, a filtration unit 202, a drinking water holding tank 203, a three-way valve 206 connected to an outlet 207, in the form of a hose or a pipe for discharge of excess water to a tank or a tub 208. The drinking water is dispensed through a faucet 204 (FIG. 2b). The water flows in the apparatus by gravity without the aid of pumps. For that purpose a venting tube 209 is connected to the connection 210 between the container 105 and the disinfection unit 201 since the flow path of the water is closed (FIG. 2a). The overflow control in the container 105 was eliminated since there are several paths for excess water to prevent any overflow in case of continuous water production without drawing the product water. In fact, it is possible to eliminate the container 105 all together and the collection of the condensate in a larger open container to be placed directly under the water condenser after removal of all obstacles to allow the formed water droplets to freely fall in said container. Such arrangement will facilitate the flow of water under gravitational forces without the need for the vent 209 and will prevent the contamination of the condensate with volatile particulates.

The disinfection unit 201 in FIG. 2a (as in the apparatus of FIG. 1) comprises a closed chamber wherein the flowing water is exposed to ultraviolet radiation emitted by a UV source 211 and the water passes after that through a filter 202 to get rid of dust particulates that may escape the air filter and any disinfection byproducts. The filter 202 is a column combining active carbon and ion exchange resin. In special cases wherein ultrapure water is needed two ion exchange columns may be used one for cation-exchange and another for anion exchange to eliminate negative as well as positive ions. The length of the disinfection and filtration units is such that the water will have enough time in the units for effective disinfection and filtration.

After disinfection and filtration of freshwater, the drinking-quality water flows to a thermally isolated storage tank 203 where the drinking water can be dispensed through a faucet 204 (FIG. 2b). When the water level in tank 203 (FIG. 2a) reaches the opening of the bypass tubing 212, water rushes by gravity to the secondary storage tank 205. When the tank 205 is filled, water flows through the valve 206 to the hose 207 to fill separate containers or to a tub 208. The three way valve 206 connects to the tank 203 however it does not allow water to flow directly from tank 203 to tank 205 or to outside the apparatus through hose 207 except in the case of when tank 203 is to be flushed for cleaning. Nevertheless, the water flow through the tubing 212 may be prevented by the three-way valve 213 and the opening of valve 206 to allow water to flow directly to tank 205 without allowing the water to flow outside the apparatus through the hose 207. The valve 206 can be closed upon filling tank 205 and replacing it by another tank. This option is appropriate for filling external bottles or exchangeable mobile containers for use the water away from the apparatus. Such facility will allow for filling water coolers or bottles for water-cooling fountains.

The expected capacity of an implementation of this aspect of the invention is 18.93 liters per day; that is about 12 liters for each meter square of the condensing surface. Such rate of production is dependent on atmospheric conditions around the apparatus especially temperature and relative humidity. For this reason, the apparatus is not expected to accumulate a large amount of drinking water when the water is drawn continuously. Nevertheless, accumulation of drinking water in excess if the capacity of the storage tank 205 and directing the produced water outside the apparatus for external supply allows the continuous operation of the apparatus over extended period without attendance or monitoring the water levels in the storage tanks.

The architecture of the apparatus can be used for production of large quantities of water by using dehumidifiers with larger capacities. Additionally, a second stage of disinfection and filtration may be used prior to dispensing the water through the faucet 204 and/or valve 206.

The apparatus of FIG. 2 was constructed and tested for performance under different atmospheric conditions to evaluate the rate of production of drinking water. Furthermore, data from the tests was collected every hour to construct a model for estimation of the change in production with changes in temperature and relative humidity. Tests included continuous operation for a minimum of 24 hours under preset conditions of surrounding air temperature and humidity. The tests were performed inside a closed laboratory and under controlled environment inside a sealed military tent as well as outdoor trials in open air during a mild winter characterized by relatively low temperature and moderate relative humidity. The synthesized model for drinking water production as function of atmospheric conditions revealed that the rate of water extracted from the air varies linearly with two main variables, relative humidity and temperature. During the open-air test, other climate factors such as wind speed outside the building, altitude, and atmospheric pressure may also have limited effect on the rate of water recovery from the atmosphere. Hourly water output, AWR (Atmospheric Water Recovered (milliliter/hour)) was found to follow the empirical relationship:

$$AWR = a + b(RH) + cT.$$

Here, RH is the relative humidity (%), T is the air temperature outside the apparatus (° C.), a=−1071, b=16, c=37 and $r^2$=Correlation Coefficient=0.9.

Table 1 shows comparison of forty-six (46) data points where the actual hourly rate of water collection is compared to that predicted by the above model. Most of the predicted hourly rates were within less than forty-milliliter (40-milliliter) of the actual values. The corresponding 95% confidence was narrow indicating a good predictability. Table 2 contains the predictions of hourly water collection rates at various humidity and temperature levels, including the mean annual minima and maxima of humidity and temperature at the Mudaylif Weather Station, near Makkah, Saudi Arabia for the year 1970. This weather data was used to evaluate the expected minimum and maximum hourly rates of water collection, under Saudi Arabia climate. The predicted ranges of the hourly rate of water collection at Mudaylif throughout 12 months of the year are also presented in Table 3. The highest water output (1743 milliliter/hour) was predicted for the highest relative humidity (95%) and the highest temperature (35° C.) while less water was predicted for lower temperatures and humidity values (Table 2).

Figure 3:
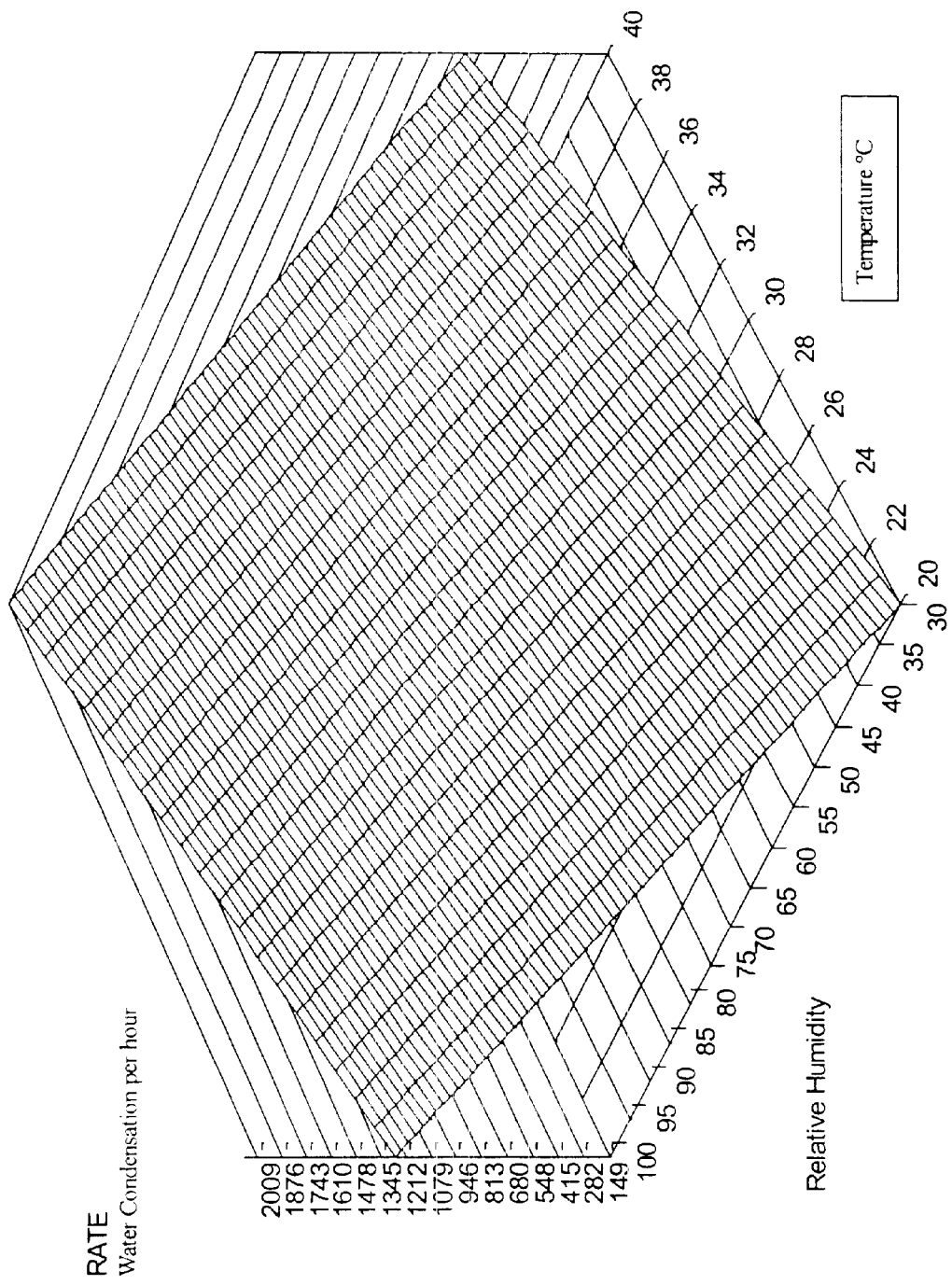
FIG. 3 is a three-dimensional graph of the rate of condensation of atmospheric water vapor per hour as function of the relative humidity and temperature in degrees Celsius.

FIG. 3 illustrates how hourly water recovery rate varies with relative humidity and temperature. The range for both variables were chosen based on the ranges of temperature and humidity observed in Mudaylif. FIG. 3 allows the reading of the expected hourly rates for any combination of humidity ranging from 30% to 100% and temperature ranging from 20° C. to 40° C. Using the data from Mudaylif, the minimum predicted hourly rate of water condensation is about 473 milliliter (11.35 liter/day) and the maximum rate is about 1631 milliliter (39.14 liter/day) (Table 2, FIG. 3). However, the actual volume of water collected is likely to be between these two values since both temperature and humidity follow a diurnal cycle where they rise or fall depending on the time of the day.

Comparison of water production from atmospheric humidity using the implementation of the apparatus of FIG. 2 and water obtained from other sources showed that the implementation of the present invention has several merits. First, negligible initial investments are required per unit of product water for the apparatus by comparison with the initial investment required per unit of product water for large desalination units. The operation cost of the apparatus is extremely low in terms of requirements for personnel, consumable material, power, maintenance, etc. The operation does not require attendance or frequent monitoring. Maintenance is very simple and only require change some of the consumable parts; which is limited to is changing the UV lamp 201 which lasts at least six (6) months on the average and the filter 202 which does not have to be replaced before one year. Addition of a charge of Freon (or equivalent refrigerants) may be necessary if any leakage took place. General cleanup of the whole system is desirable, especially of the dehumidifier unit to prevent accumulation of dust and sand especially if the apparatus is used outdoors. Furthermore, cleanup and disinfection of the container 105 is necessary to prevent growth of algae and slimy buildup. Such care of the apparatus may be accomplished in a manner appropriate for the user; however quarterly cleaning as a minimum is preferable. Furthermore, the apparatus does not require pumps or piping for water flow, dispensing or distribution. The apparatus is a mobile standalone system that can be transported easily from one place to another and can be stationed practically anywhere. The apparatus can be used in remote areas and isolated population pockets far away from populated centers especially in locations not covered by urban water distribution networks. The apparatus is appropriate for supply of water in emergencies wherein other water production methods fail or are unattainable. In such cases, the only requirement is plugging the apparatus in a power source such as a diesel generator.

Several measurements were taken during the testing of the implementation of the apparatus of FIG. 2 to evaluate the quality of the drinking water. Such measurements included turbidity (measured in NTU) to examine organic particulate contaminants; conductivity (measured in micro Siemens) to examine the total dissolved solids (TDS) or the concentration of sodium and other electrically charged minerals; salinity or the amount of sodium chloride in terms of parts per million parts of $H_2O$; and pH. The results of the quality evaluation are given in Table 4 listing the quality of freshwater and drinking water produced by the apparatus, to assess the effect of disinfection and filtration of the condensate. The results are compared with the drinking water standards established by the World Health Organization (WHO), the standards of drinking water during emergencies, which are set at the upper limits of turbidity, TDS, salinity and acidity. Also listed are the quality parameters of other sources of drinking water; namely Evian mineral water sold in the market as high purity drinking water and the common tap water (samples were taken from municipal water). Water from all sources is within the safe limits of contaminants in drinking water. The turbidity is less than the maximum and closer to the established minimum of drinking water standards with tap water being the highest due to the presence of chlorine and Evian water being the least. Conductivity of water extracted from humid air is very close to that of distilled water. The highest conductivity is that, of tap water due to the presence of minerals and ions, followed by Evian mineral water due to the presence of mineral compounds, followed by distilled water with added salt at a concentration of 100 parts per million of natural pure rock sea salt. The salinity is the highest in Evian water. By addition of salts to distilled water, the salinity became equal to that of tap water. The pH measurements showed that tap water tends to be base followed by Evian water. The water extracted from the atmosphere tend to be acidic so is the distilled water.

No biological analysis was conducted of the product water since the apparatus was used in controlled environments. Such analysis may be necessary to examine the effectiveness of the ultraviolet disinfection stage, when the apparatus is used in likely to be polluted environment, such as an office, a residential closed space or outdoors.

Further tests of the apparatus included evaluation of the taste in a limited sample of the population, wherein four water samples were used: (Sample 1) freshwater from an artesian well, (Sample 2) distilled water, (Sample 3) product water from the apparatus with an added 200 parts per million of natural pure rock sea salt, and (Sample 4) product water from the apparatus with an added 500 parts per million of natural pure rock sea salt. The limited experiment resulted in equal grade for the artesian water (Sample 1) and the water produced from atmospheric humidity with an added 200 parts per million of natural pure rock sea salt (Sample 3); followed by the distilled water (Sample 2), and then product water from the apparatus with an added 500 parts per million of natural pure rock sea salt (Sample 4).

During implementation of the apparatus of FIG. 2, care must be taken of the air pressure balance in the various components and tightening the connections between the tubes and the different containers to avoid leakage and spillage to the outside. To maximize the benefit from extracting the water from hot humid air, the apparatus need to be located in a place where hot humid ambient air can freely flow through the inlets of the dehumidification unit atop the apparatus. Preferably, the apparatus should be located in a non-air-conditioned space; noting that the productivity is dependent on the temperature and humidity of the air in the vicinity and immediate contact with the apparatus. If the apparatus is to be located inside a building, preferred places include: kitchen, a warm corridor or hall, a terrace, a sunroom or a balcony. The apparatus can be located anywhere outdoors, preferably downstream of the direction of strong air flow or hot and humid wind, otherwise an external fan may be used to direct the air through the openings of duct 104 at the front side 103 of the unit 100. The apparatus does not require attendance in either case since it operates automatically unless a failure took place in the rotating parts or the refrigeration cycle equipment of the dehumidifier or a power outage took place.

Figure 4:
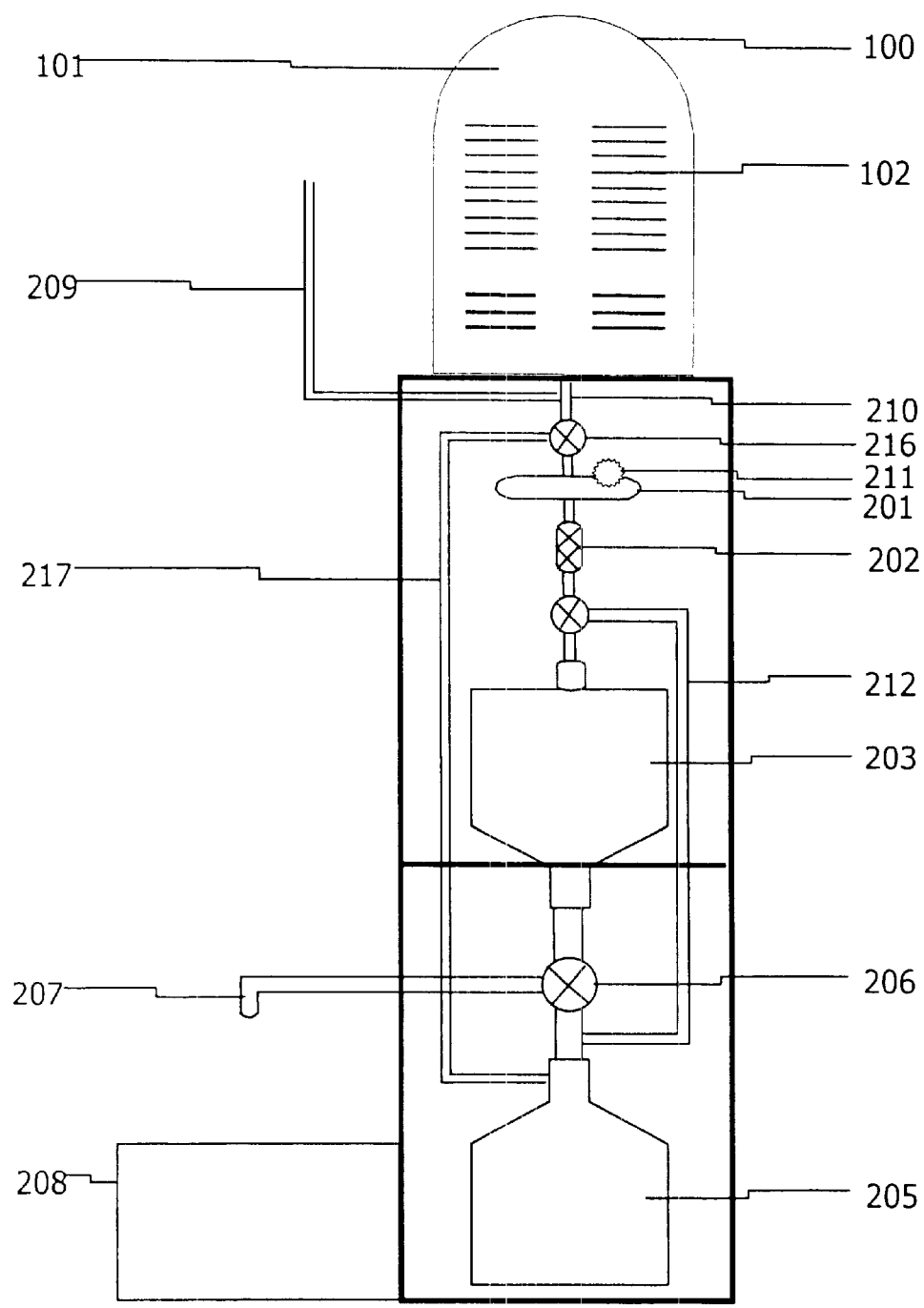
FIG. 4 shows a side view of an embodiment of a device similar to the device of FIG. 2 wherein freshwater in excess of the capacity of the potable water tank is directed before disinfection and filtration for different uses.

In a modification of the apparatus shown in FIG. 2, a portion of the freshwater is used prior to disinfection and filtration by directing a stream of condensate through a valve 216 and tube 217 directly to an interchangeable freshwater tank 205 as shown in FIG. 4. The tank 205 may be filled and replaced by another empty tank or exchangeable bottles to be filled and so on. This is in addition to the use of the hose 207 to direct the freshwater to an external tub 208 for direct use outside the apparatus. The diversion of untreated freshwater for purposes other than drinking will save in the replacement cost of the consumable UV sources and filters, and hence increase time to failure and the time to replacement. Nevertheless, an air filter must be added at the inlet of the hot humid air to prevent escape of contaminants to the condensate and hence to the freshwater. The air filter will also prevent the intrusion of sand, dust or pollutants in the unfiltered freshwater stream when the apparatus is used by the seashores, for example. The presence of dust particles in the system will enhance corrosion of the water condenser and may clog the air stream and the water passages. This is in addition to the acceleration of the end-of-life of the filter that produces clean drinking water. The apparatus of FIG. 4 is the preferred embodiment of this aspect of the invention.

Figure 5:
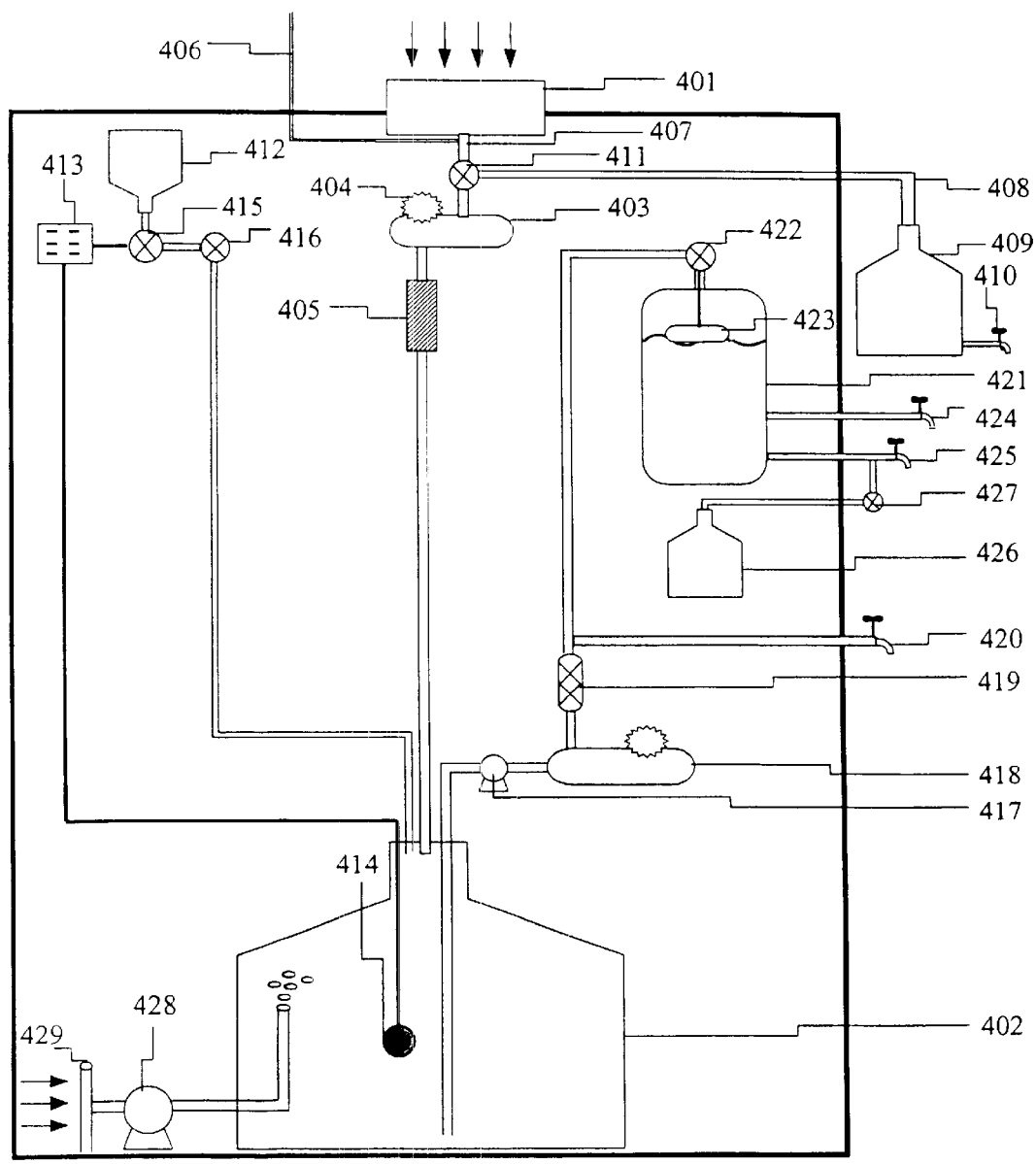
FIG. 5 shows a side view of an apparatus for production of freshwater by condensation of water vapor from hot and humid air using any type of condensation equipment and diverting part of the water product for use as freshwater while converting most of the condensate to filtered and disinfected water suitable for drinking with added minerals for improvement of taste, to be drawn upon need as warm, cold or cold carbonated water with the aid of electric pumps; and the drinking water is disinfected by the use of ultraviolet lamps, while the freshness of the water product is maintained by aeration.

Another aspect of the invention is shown in FIG. 5, wherein water flow is driven by pumps of different capabilities to support the use of gravitational forces. The apparatus draws the outside humid hot air by a fan and condensates the humidity from the forced air on surfaces cooled by a refrigeration cycle. In the implementation of the apparatus, an air-drying unit similar to that of the apparatus of FIGS. 1, 2 and 4, was used employing conventional CFC refrigerant; such as Freon. However, the operation and configuration of the apparatus do not depend on the construction of, the condensing surfaces or the refrigeration cycle. The condensation can be achieved by surfaces cooled by thermoelectric means, by thermo-acoustic refrigeration, or by passing a cooling fluid from any source through the tubing or coils of the water vapor condensation surface. The water treatment methods used to produce pure drinking water from the condensate and to supply water to the ultimate user of the apparatus can be implemented with any type of water vapor condensation system.

In the apparatus of FIG. 5, the condensate from the water condensing surfaces is collected in a relatively medium capacity intermediate container 401 from which the water flows by gravity to a main water holding tank 402 of a large storage capacity at the bottom of the apparatus after passing by a disinfection stage and a filtration stage. Disinfection is accomplished in a chamber 403 where water is exposed to radiation from a UV source 404 to eliminate any bacteria that may contaminate the water. Here, care must be taken to periodically inspect the UV source 404 to assure its proper operation, when the lamp is burnt it should be changed immediately and the chamber 403 should be cleaned.

Following freshwater disinfection, the disinfected water flows by gravity to the following stage for filtration by a preliminary filter 405 containing a portion filled with ion exchange resins and a smaller portion of activated carbon. Alternatively, cation and anion exchange may be used in the preliminary filtration. The role of the preliminary filter 405 is to take out all mineral and organic matter that may be suspended in the water stream, including metallic particles that may flow with the water and that may be presence because of erosion or corrosion of the surfaces in contact with the water. The useful life of the preliminary filter 405 is dependent on the extent of use and the type of contaminants that enter with the air and move around in the condensing unit. Changing the preliminary filter 405 periodically (every four months) may be necessary for continuous operation, especially when the taste of the product water changes and starts to have a metallic taste.

Filtration of the water at the preliminary collection stage may be advisable, but it is only a precautionary measure to assure the absence of dust particulates since the condensation process is open to the surrounding air. Furthermore, erosion of metallic surfaces is likely due to the reaction of the condensate with the structure since the chemical characteristics of the condensate is practically the same as those of distilled water and hence it attacks any metal surface it passes by and releases particulates by erosion.

Following the preliminary filtration, the water rushes down in a free fall to the holding tank 402. To assist the free fall a vent 406 is attached to the tube 407 that connects the container 401 with the disinfection unit 403. This will provide the pressure that pushes the water down. A valve 411 is connected to the tube 407 to direct the freshwater either to the disinfection unit 402 or to the pipe 408 that carries the freshwater outside the apparatus before disinfection and filtration to a freshwater auxiliary tank 409 where it can be dispensed by a freshwater faucet 410. The faucet can be used to fill freshwater bottles for use away from the said apparatus. The tank 409 and the faucet 410 may b replaced by an open tank to drain any desired quantity of freshwater for uses other than drinking. The manner in which the freshwater supply is used is not limited except by the rate of production of the apparatus, which in turn depends on the extent of the condensation surface and the climatic conditions.

For medical uses of the product freshwater, the water has to be filtered and disinfected preferably by ultraviolet radiation immediately prior to withdrawal.

A simple activated carbon filter may be used to filter the freshwater running from valve 411 to tank 409, to eliminate any dust or sand. Alternatively freshwater may be settled in the tank to precipitate any sediment before dispensation providing the faucet 410 is raised above the bottom of tank 409. This precautionary measure may be used if the location of said apparatus is subject to contamination by the ambient air.

Since the condensate collected from the atmosphere is free from useful minerals and has characteristics similar to distilled water in purity and tendency to react with the surfaces of water passages, mineral addition may be necessary to provide the nutrition value of natural water and to prevent chemical reactions with the containers.

There is a controversy about drinking ultrapure distilled water. Some believe that drinking mineral-free water over an extended period is harmful since distilled water will deplete minerals from the human body and discharge it with urine. Minerals and the associated electrolytes play a major role in maintenance of health and vitality. However, the opposing point of view believes that distilled water is not harmful as long as the human intake includes mineral supplements and foodstuff containing a sufficient supply of nutritive minerals.

A mineral addition unit is included in the construction of the apparatus outside the water flow system and the storage tank 402. The minerals necessary to adjust the mineral content of the drinking water are supplied by a small tank 412 containing saline water solution formed by dissolving sea salt or naturally occurring rock salt in distilled water. The product water from the apparatus can be used to replenish the solution. Alternatively, filtered seawater may be used when available. Sea salt or natural rock salt is preferred to table salt due to the presence of balanced minerals in natural salts. The saline solution can be substituted by mineral solutions readily available in the market, however consultation with health care specialists may be advisable in this case. In all cases, the tank 412 need to be monitored by frequently checking the presence of enough saline solution; however, the user will be able to schedule inspection of the minerals supply based on usage and experience.

The mineral addition unit comprises a conductivity adjustment unit that consists of a calibrated board 413 to adjust the mineral content in the drinking water by adjusting the conductivity level, a conductivity sensor 414 immersed inside the tank 402, a solenoid control valve 415, and a needle control valve 416. The adjustor 413 and the sensor 414 are manufactured by George Ohio, USA or equivalent. The solenoid control valve 415 and the needle control valve 416 can be obtained from Power Aire™, Fullerton, Calif., USA or equivalent. Other companies that produce conductivity sensors, adjustors and valves include Wilchum™, Hillston Mass., USA and Lifestream Water Purification Equipment™, Huntington Beach, Calif., USA.

When the sensor 414 detects low mineral content in the holding tank 402, it sends a signal to the conductivity adjustment board 413, which in turn actuates the solenoid valve 415 to release concentrated saline water from the tank 412. The saline solution drops fall by gravity through the needle valve 416 to replenish the mineral content of the water in the holding tank 402 until the desired conductivity level is reached. Then the sensor 414 sends a signal to the valve 415 through the board 413 to stop the flow of saline water. The process is repeated automatically to maintain an appropriate concentration of minerals in the product water as it is drawn by the user. When the level of minerals exceeds a specified limit in the tank 402, the saline water flow is reduced by actuation of the needle valve 416 to reduce the rate of dripping of saline water.

The apparatus of FIG. 5 also comprises an automatic on demand pump 417 that operates when the drinking water is drawn and the pressure inside the system is reduced. The pump 417 is manufactured by SureFlo™, Browly, West Sussex, UK or equivalent. When all faucets are locked and no drinking water is drawn, the pressure in the system rises and the pump 417 stops. This feature increases the lifetime of the pump and stretches its use. The pump 417 operates on twelve volt and continuous current and hence it is connected to a current transformer to step down the voltage from 110 Volt or 220 Volt continuous current to 12 Volt continuous current. The transformer is supplied by Bicron Electronics™ or equivalent. At the start of operation 10 amperes are needed, however as the operation starts, only 6 volts are required for operation. It is necessary to stop the pump 417 when the tank 402 is empty, otherwise the pump 417 will continue operating with no load until enough water fills the tank 402 which may take long time if the ambient air is mild and has low humidity. This will reduce power consumption and increases the useful life of the pump.

The water flows from pump 417 to a second stage of water treatment wherein water is disinfected by UV radiation in the disinfection unit 418 and then filtered by active carbon filter 419, produced by Rubbermaid™, Cameron Carbon, Inc., Baltimore, Md.; or Hermotz™ filter, Plymouth, Minn., USA or equivalent. The filter 419 is used to remove suspended contaminants that may accumulate in the holding tank 402 when the water draw is slow. This is to assure freshness and purity of water before drinking. The life span of the activated carbon filter 419 depends on usage but it is one-year one the average. Accordingly, the filter cartridge needs to be replaced every 12 months at least, especially when the taste of the water changes.

Filtered water from filter 419 is lifted into a tube that splits into two paths. One path is connected to an outlet for delivery of drinking water at ambient temperature, which may be dispensed from a faucet 420. The other path is directed to a thermoelectric water chiller 421 located at an elevated level from the holding tank 402. In the implementation of this aspect of the patent, the stainless-steel water chiller is a commercial water cooler manufactured by Canaletas S.A., Barcelona, Spain and modified by Advanced Thermoelectric Products™, Nashua, N.H., USA. Other drinking water coolers may be used; for example Koolatron™, Rochester, England UK, Pure Earth Technology™, Marietta, Ga., USA, or equivalent. In addition, coolers that use conventional CFC cycle such as freon may be used, such as Oasis™, Columbus, Ohio, or Larco™, Inc., Harrisville, N.H., USA; Sunroc Gas™, Maryland, USA, Tianjin Tahoe Cooler, Tianjin, China, or equivalent.

The modifications of the commercial thermoelectric water cooler unit were introduced due to the need for connection to the water pipes of the apparatus which required sealing the cooling unit after making the connections to prevent water leakage under internal air pressure since the unit is designed as a stand alone system operating with bottled or tap water. The drinking water is pumped from tank 402 via pump 419 to the cooler 421 for cooling of the drinking water before dispensing by the cold-water faucet 424 or the cold carbonated water faucet 425. A floating valve 422 precedes the cooler 421 to regulate the water flow to the cooler to prevent accumulation of water pressure in the cooler 421 and thus leading to malfunction in the cooler or to overflow and spillage of water to the outside.

When the tank of the cooler 421 is filled, water accumulates raising the plastic float 423 until the floating valve 422 is shut off and the pump 417 stops. When water is drawn from the cooler 421, the floating valve 422 opens to allow the pump 417 to pump additional water until the tank of the cooler 421 is filled again to assure that it is filled all the time as long as water can be drawn from tank 402.

As the carbonated water faucet 425 is opened carbon dioxide flows from the pressurized gas tank 426 to the mixer 427 wherein the cold water from the cooler 421 is mixed with the gas to provide carbonated water through the faucet 425. The production equipment of carbonated water are commercially available and can be obtained from Soda Jerk™ or McCann's Fast Flow Carbonator™, KegMan Products™, Broad Brook, Conn., USA, or equivalent. A pressurized gas drum can be used in place of the gas storage 426.

The water in the storage tank 402 is aerated to refresh the water and prevent changes in the taste, if the water stays stagnant for relatively long periods without use. Aeration is accomplished by pumping a stream of air, by air pump 428 through an air filter 429 to prevent dust or contaminants from mixing with the stored water. The air filter is available commercially such as the filters produced by 3M for use with air conditioning systems. Air filters that remove ionized particulates are preferred. In general, aeration of drinking water improves the taste.

Alternatively, oxygen may be extracted from ambient air and pumped into the storage tank 402 as oxygen bubbles to refresh the water and prevent changes in the taste. Precautions have to be taken to safely release excess oxygen to avoid potential explosions.

When using the apparatus for the first time several startup steps are necessary to follow, to assure high performance. For example, the apparatus must initially operate for a day (from 12 hours to 24 hours) to collect sufficient water or until most of the storage-volume of tank 402 is filled before connecting the conductivity regulator 413, the pump 417 and the cooler 421 to the electric power supply and the start of dispensing the water. Alternately, the apparatus can be primed by filling the tank 402 with drinking water before startup. This step is necessary to protect the pump 417 from malfunction and maintain its performance at high efficiency level. As soon as sufficient water level is achieved in tank 402, the pump 417 and the cooler 421 can be switched on and the conductivity regulator 413 can be connected to the electric outlet. Furthermore, it is recommended to wait about thirty minutes (or for time equal to the residence time for cooling the water, per instruction or specification of the cooler manufacturer) before dispensing of the cold or the carbonated water; however, warm water can be drawn meanwhile.

After startup of the apparatus, the operation continues without attendance, since the operation will proceed automatically unless an unexpected malfunction took place in the apparatus or any of the main components. Human interference is required only in case the tank 402 becomes empty, when the water withdrawal is excessive or when the stored water becomes insufficient to supply the water demand, because of slowing down in production due to changes in weather conditions. When the tank 402 becomes empty, the operation of the pump 417 must be terminated manually. The apparatus should be operated long enough to collect sufficient water from the atmosphere for the pump 417 to operate efficiently and for the conductivity regulator 413 to perform satisfactorily. As soon as sufficient water level is achieved in tank 402, the pump 417 and the cooler 421 can be switched on and the conductivity regulator 413 can be connected to the electric outlet.

To adjust the mineral content of the product water to the desired concentration, a saline solution is prepared by dissolving natural salt (sea salt) in distilled water (or drinking water) at a ratio of 2% by volume. The solution is then poured in the vertical tank 412 for saline water storage. The conductivity regulator 413 is then adjusted initially at 300 :S to set up the level of the mineral content in the drinking water at about 300 parts per million. This level can be adjusted later according to the desired taste. However, the adjustment of the mineral content is preferably done before operating the mineral addition unit by adjusting the conductivity regulator 413 to the desired level after filling the tank 402. If the level is higher than the tolerance taste, the conductivity regulator 413 may be adjusted to 200 :S, for example. The results of a limited taste survey showed that acceptable taste of drinking water could be provided by adjusting the conductivity to a level ranging from 300:S to 350 :S.

Routine and preventive maintenance of the apparatus required for maintaining the efficiency of water production and the quality of the drinking water includes periodical cleaning of the container 401 that collects the condensate from one to two weeks dependent on the location of the apparatus and the degree of exposure to dust, sand and pollutants. Cleaning is achieved by removal of the container and washing it with lukewarm water and baking soda or any other means appropriate for cleaning of containers filled with still water to remove the slimy substance that may be deposited and retained in the container. Periodical inspection and replacement of consumables is necessary. Visual inspection of the functionality of the ultraviolet sources 404 and 418 would give an indication of whether the source requires immediate replacement or not. A dim light or dark source indicates that the source is consumed. The preliminary filter 405 may be replaced every three months or less dependent on the degree of contamination of the condensate and according to the instruction of the manufacturers. The active carbon filter 419 may be replaced every six months or less dependent on the duration of use and according to the instruction of the manufacturer, or if the taste of the water changes.

During periods of minimal or insignificant cold potable water consumption, a connection can be made between the cooler output for controlled flow of cold water to a set of condensing coils to condensate additional water vapor during such periods to replenish stored water for use during periods of high consumption. Such arrangement can be useful in regions characterized by high humidity night and low humidity and smoldering heat in the daytime.

Figure 6:
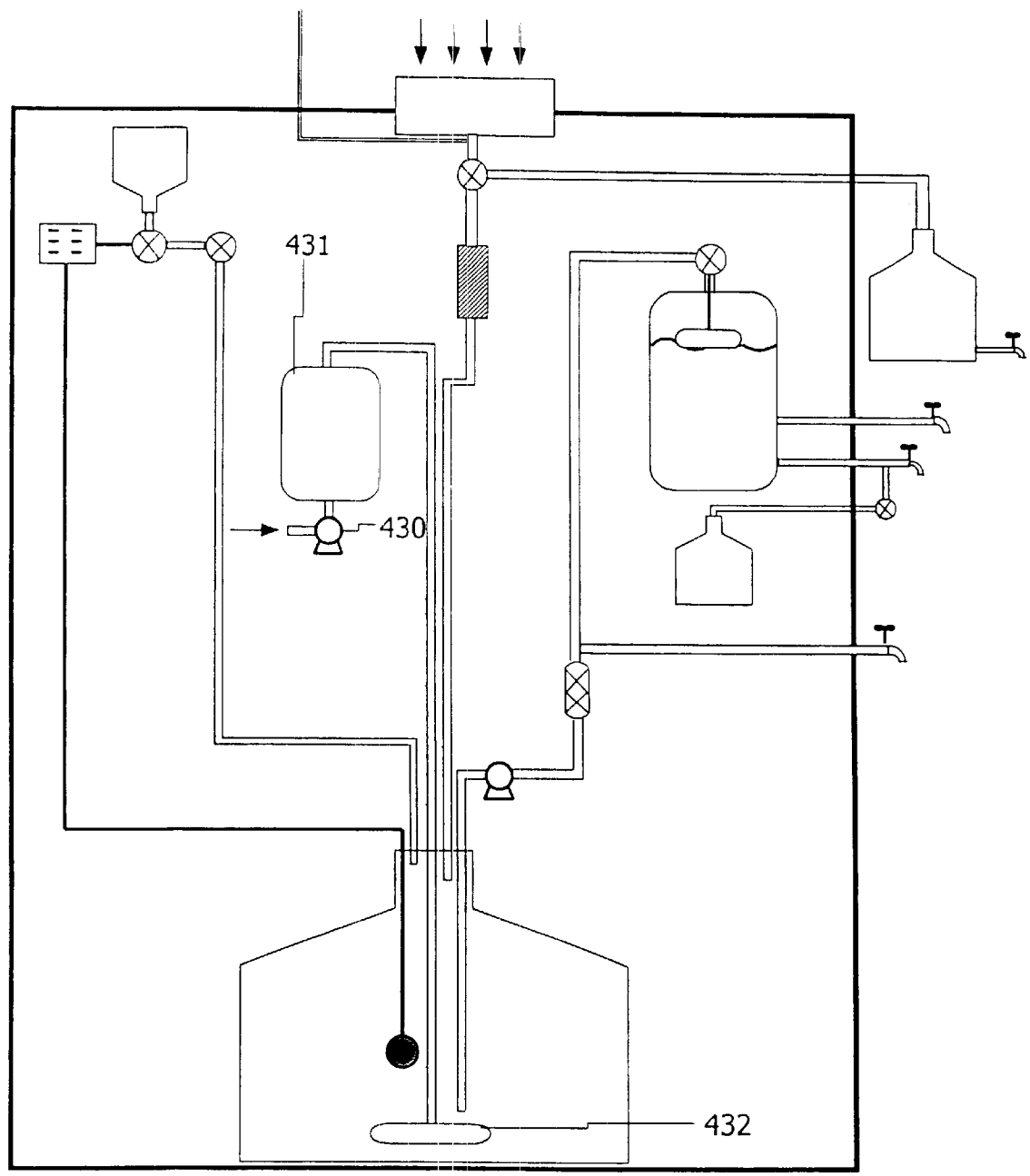
FIG. 6 shows a side view of an apparatus for production of freshwater by condensation of water vapor from hot and humid air using an arrangement similar to that of the apparatus in FIG. 5 with ozone as the method of water disinfection and hence no aeration is required.

Disinfection of water can be accomplished by ozonation of the water instead of the use of ultraviolet disinfection, as shown in FIG. 6, wherein the ultraviolet disinfection unit 403 prior to water storage and the ultraviolet disinfection unit 418 prior to dispensing of the drinking water are eliminated as well as the aeration unit components 428 and 429. Although ultraviolet radiation is effective in disinfection of water by elimination of bacteria prior to the storage of water, microorganisms can infiltrate the water storage tank 402 and rapidly multiply and hence it is necessary to disinfect the water prior to use. This is not the case when ozone is used. In addition, the continuous ozonation and aeration of water will maintain the water quality and improve the taste.

In FIG. 6, an air pump 430 is used to drive the ozone generator 431 that feeds ozone to the tank 401 through the stone 432 that releases and distributes ozone throughout the stored water. The activated filter 419 will absorb the ozone residues from the water prior to the use. Ozone generators and ozonators of different capacities are commercially available and can be customized to the application according to specifications. Ozonators are produced by Ozomax™, Montreal, Quebec, Canada; Water Ozonator™, Sota Instruments, British Columbia, Canada; and Ozoteck™, Yreka, Calif., USA, or equivalent.

Figure 7:
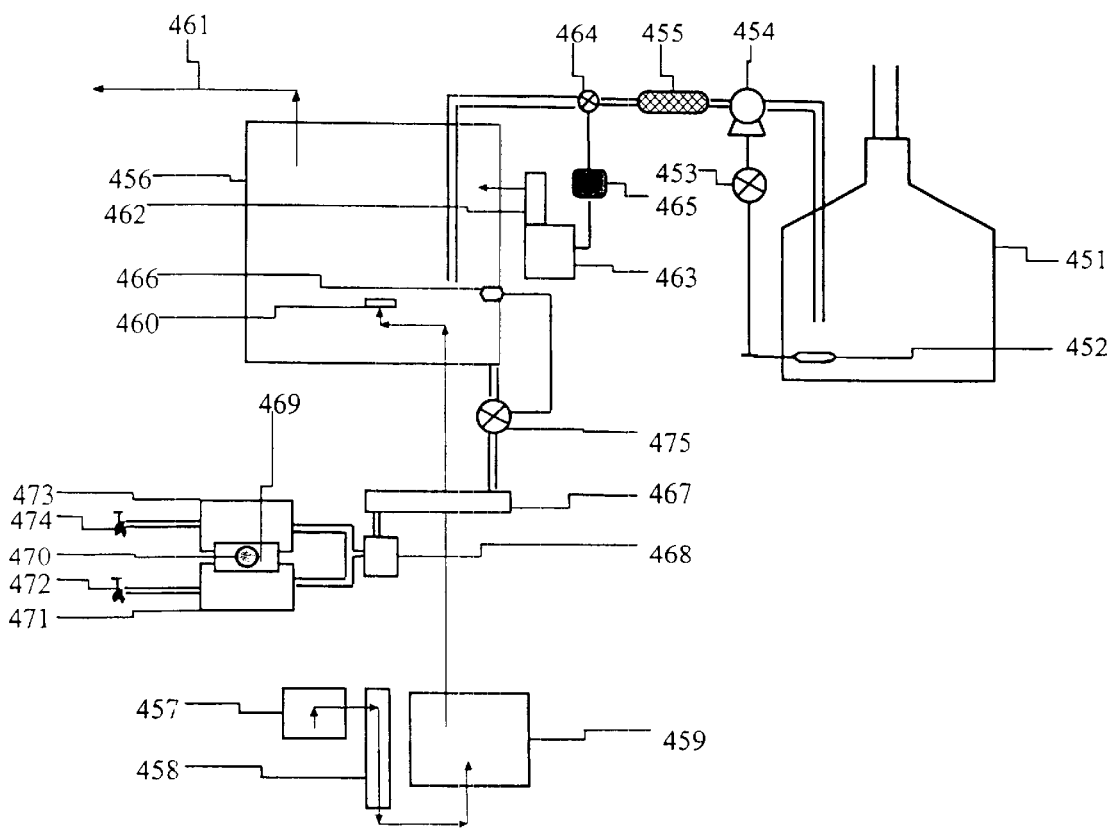
FIG. 7 shows a side view of an apparatus for production of freshwater by condensation of water vapor from hot and humid air with functions similar to that of the apparatus in FIG. 6 using a different arrangement for water flow and disinfection to produce cold and hot drinking water for limited use.

An alternative aspect of the apparatus in FIG. 6 is the apparatus in FIG. 7 wherein a different implementation is provided of the water flow, treatment and withdrawal. The condensate flows directly from the condensing surface to the storage tank 451. Upon filling the tank 451 a signal is transmitted by the level float 452 to an electronic controller 453 to actuate the pump 454 which pumps the collected water through filter 455 directing it to a larger water tank 456 wherein water disinfection takes place using ozone gas. The ozone gas is generated by drawing air using an air pump 457 and drying the air by an air dryer 458 for ozone extraction from the air by the generator 459. The generated ozone spreads in the tank 456 through a ceramic distributor 460. Excess ozone bubbles on the water surface in tank 456 where it is directed to the condensation cabin through the vent 461 to freshen the air and disinfect it to oxidize the residual volatile organic particulates and bacteria that may enter with the hot and humid air and multiply on the surfaces inside the condensation chamber. Minerals are added to the drinking water in the tank 456 through a dosing pump 462 that draws the mineral source concentrate from a saline solution tank 463 that is continuously replenished with a solution of distilled water with dissolved minerals that provide valuable nutrition as well as enhance the taste of the water. The dose is adjusted according to the rate of withdrawal of freshwater from tank 451 as sensed by the flow meter sensor 464 that measures the rate of withdrawal of the potable water.

The ozonation unit is produced by Ozomax, Montreal, Quebec, Canada or equivalent; and the minerals dosing pump is produced by Aquatronics Aqua Dose™; Kent Aqua Dose Delivery System™, LMI Electronic Chemical Metering Pump™, or equivalent.

Precautions have to be taken in venting ozone to the air due to toxicity problems that may result from release of high levels of ozone. However, ozone changes form rapidly as it is released whether in the water stream for oxidization of contaminants or in the air. Precautions measures are standard implementations in all commercial devices.

It is important to control the rate of water flow according to the quantity of water accumulated in the tank 456 using a valve 475 connected to the bottom of the tank 456. When the water level in the tank 456 reaches a limit specified by the float 366, the valve 475 opens and water rushes through the polishing filter 467 with the assistance of a small electric pump that pumps the water into a thermoelectric cooler 469 of a limited capacity to produce cold drinking water. Although conventional cooling of water can be used however, thermoelectric cooling is preferred for saving in electric power consumption and elimination of the need to use CFC refrigerants. In either case, a thermal regulator 470 will be used to control the water temperature to allow dispensing of the cold water from the cold tank 471 through the faucet 472 at the desirable temperature. The reject heat from the cooling process is used to heat a portion of the product water for personal use, such as the preparation of hot drinks. The hot water is drawn from the heat sink 473 through the faucet 474.

Figure 8:
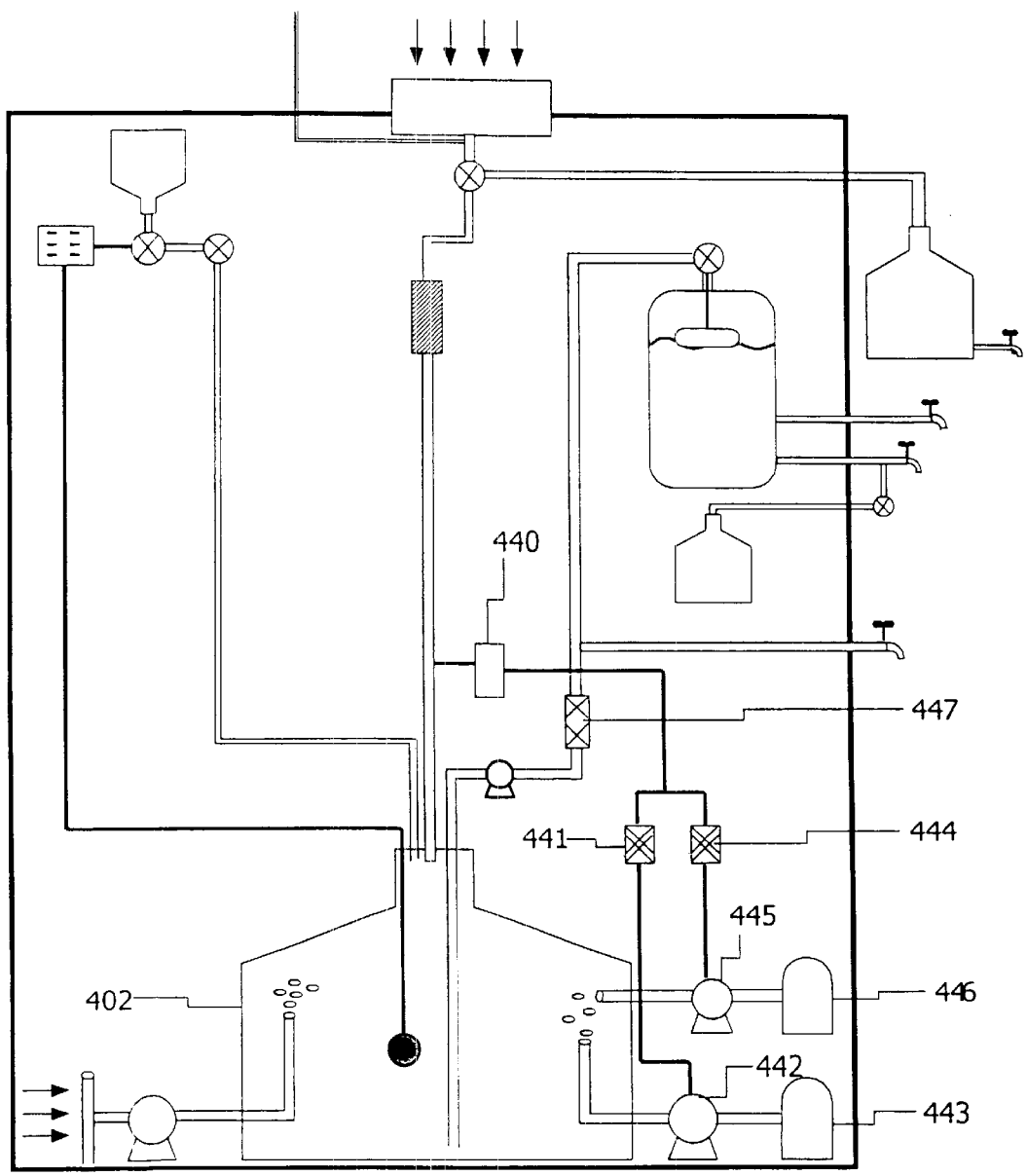
FIG. 8 shows a side view of an apparatus for production of freshwater by condensation of water vapor from hot and humid air using an arrangement similar to that of the apparatus in FIG. 5 with chlorine as disinfectant and the addition of fluoride to the drinking water.

The aspect of the invention shown in FIG. 8 uses chlorine in disinfection of freshwater to produce drinking water from water condensated from hot humid air. The chlorine dose depends on the rate of water withdrawal from the system. Accordingly, the flow meter 440 measures the quantity of water entering the tank 402 and accordingly the electronic controller 442 that activates the dosing pump 442 to pump in the water tank 402 a pre-measured quantity of chlorine from the chlorine storage tank 443 proportionate to the amount of water added to the tank 402.

The advantage of chlorine as a disinfectant is that it does not leave the water as does the ozone and is not a temporary disinfection process as is the ultraviolet radiation. The drawback is that addition of chlorine changes the taste of the water. However, the polishing filter 447 will remove the chlorine prior to dispensing the drinking water.

The amount of chlorine addition to potable water is determined by the local potable water standards as well as the World Health Organization.

The apparatus of FIG. 8 also comprises a unit to add fluoride, which is needed to retard the decay of teeth especially when the consumer is dependent only on water from the atmosphere. The fluoride dose is determined by the rate of water addition to the tank 402 as determined by the flow meter 440. According to the rate of water flow, the electronic controller 444 sends a signal that actuates the dosing pump 445 that draw the appropriate quantity of fluoride from the tank 446 and inject it in the tank 402.

The amount of fluoride addition to potable water is determined by the local potable water standards as well as the World Health Organization.

Generally, the aforementioned aspects of the invention accommodate for any type of water vapor condensation without the limitation of the adaptation of a dehumidifier or an air conditioning unit in a closed space. This will allow great latitude to freely increase the condensation surface and accordingly a great increase in water production. Furthermore, the apparatus can be optimally designed as a water production unit without the limitations imposed on water production from the constraints of dehumidification or cooling of the space, especially when the apparatus is used outdoors in an open space. In addition, automatic controls can be effectively added for optimal economic performance. The filtration of the inlet air will assure the purity of the water when the apparatus is used outdoors while reducing the burden on the water treatment units.

To rearrange the equipment of an apparatus, such as that of the invention aspect of FIG. 2, and place them on a horizontal surface, pumps have to be used to assist the water flow by gravity and several modifications have to be introduced. The rearrangement will extend the footprint of the apparatus but will provide easy access to all the components, provide flexibility in the selection of its location, and expand the direct use of the water product. The embodiment of the small apparatus shown in FIG. 9 uses a commercial dehumidifier unit 500 to condense water vapor from the atmosphere for operation in regions characterized by very hot and humid climate wherein water is driven by pumps. In addition to the suction fan inside the unit 500, a blower 501 is used to direct the hot humid air through the openings of the unit 500 to increase the rate of condensation of water vapor entrained in the surrounding atmosphere. The operation of the blower 501 is regulated by a regulator 502 that senses the temperature and relative humidity of the surrounding air and computes the instantaneous absolute humidity. If the humidity is below a set limit determined by the rate of condensation of the water vapor, the electric power supply 503 is interrupted by the circuit breaker 504 to stop the blower 501 and the operation of the unit 500. The limit is determined by the value of water, compared to the cost of power. This trade off depends on the location of the apparatus, the need for the product Water, and the local cost of alternative drinking water or freshwater water supply sources.

The condensate is collected in the container 505 from which the collected water is drawn by the water pump 506 and directed to the ultraviolet disinfection unit 507, then to the filter 508 and to the large storage tank 509. A float 510 is used to monitor the water level in the container 505 and interrupt the operation of the pump 506 through the circuit breaker 511 when the water level goes below a specified limit under which the operation will not be efficient and may damage to the pump 506. Idle operation of the pump 506 with no water in the container 505 or when the water level is very low, could damage the pump, and will waste electric energy. The float 510 starts the pump 506 when the water level reaches a safe limit at which no air bubbles will escape to the pump 506 and cause cavitation. A level sensor may be used in place of the float.

To improve the taste of the drinking water air bubbles may be injected in the tank 509 through the air filter 512 with the assistance of the air pump 513. The water can be dispensed from the faucet 514. In case of overflow of water-production, the excess water may be directed to an outside container 515. Other disinfection techniques may be used especially ozonation, since small ozone generators can provide the required charges. In addition, a cooler can be provided to supply cold water in place of the container 509, without significant additional weight or extensive spread in the footprint.

Figure 9:
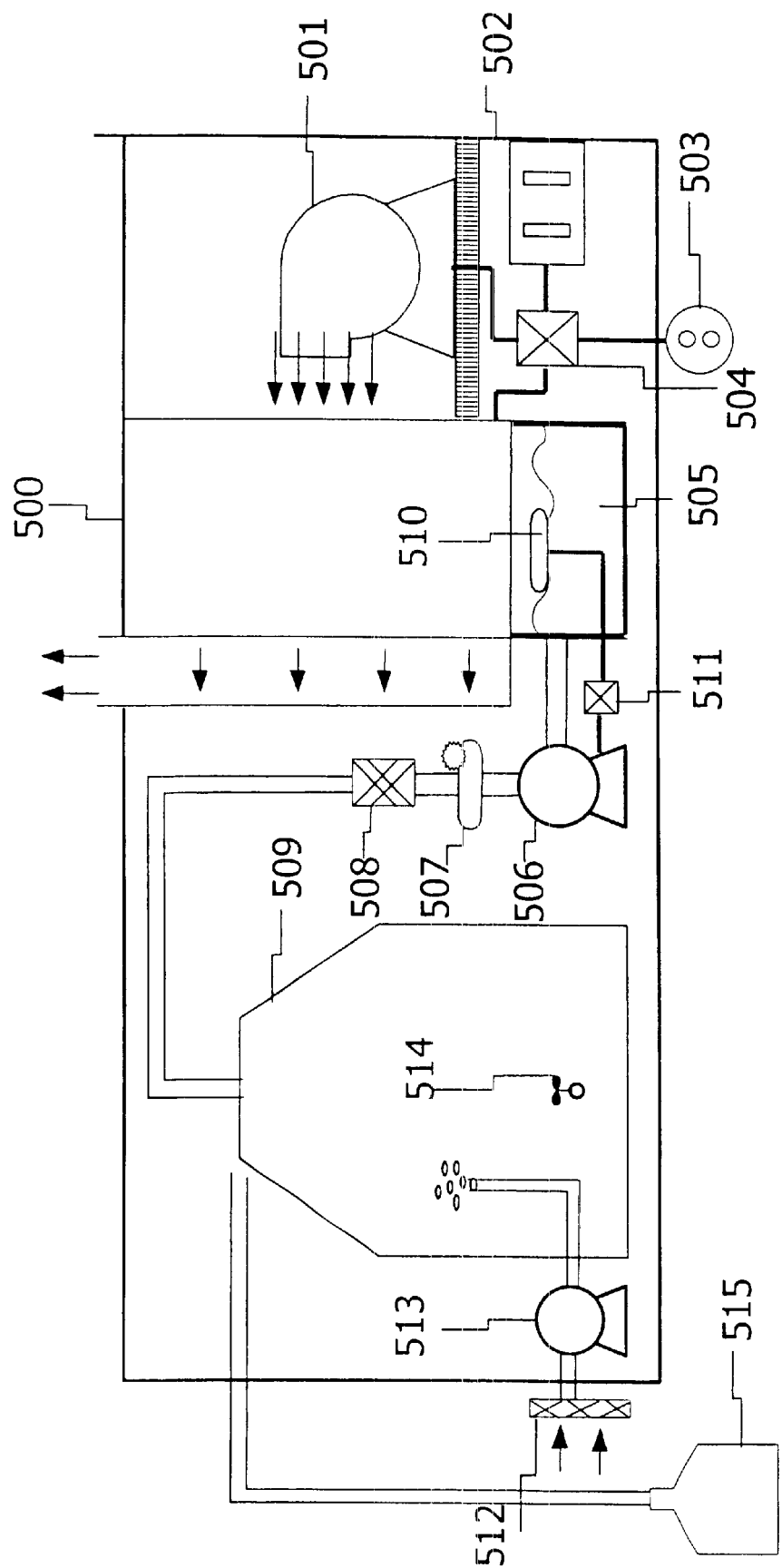
FIG. 9 shows an apparatus for production of freshwater that can be placed on a table or bench in a kitchen or a raised platform in a truck or a boat, to supply drinking water to a small group of people, by adaptation of a commercial dehumidifier for condensation of water vapor from hot and humid air and wherein pumps are used to drive the water flow in the system.

The small apparatus shown in FIG. 9 for production of freshwater and drinking water from the atmosphere can be placed on a table or bench in a kitchen or a raised platform on a truck or a boat, to supply drinking water to a small group of people. The apparatus can be used in emergencies to supply potable water to a household or a small group of people. In this case, a stand-alone power supply may be used in case the power requirements cannot be provided by the generator of the vehicle.

The apparatus in FIG. 9 can be used to extract water vapor from a small air cooling unit, if available in the location wherein water supply is desired, such as the air condition of a boat, an automobile or a larger vehicle such as a van or a truck, providing the size of the apparatus can be retrofitted on the land or water vehicle.

Figure 10:
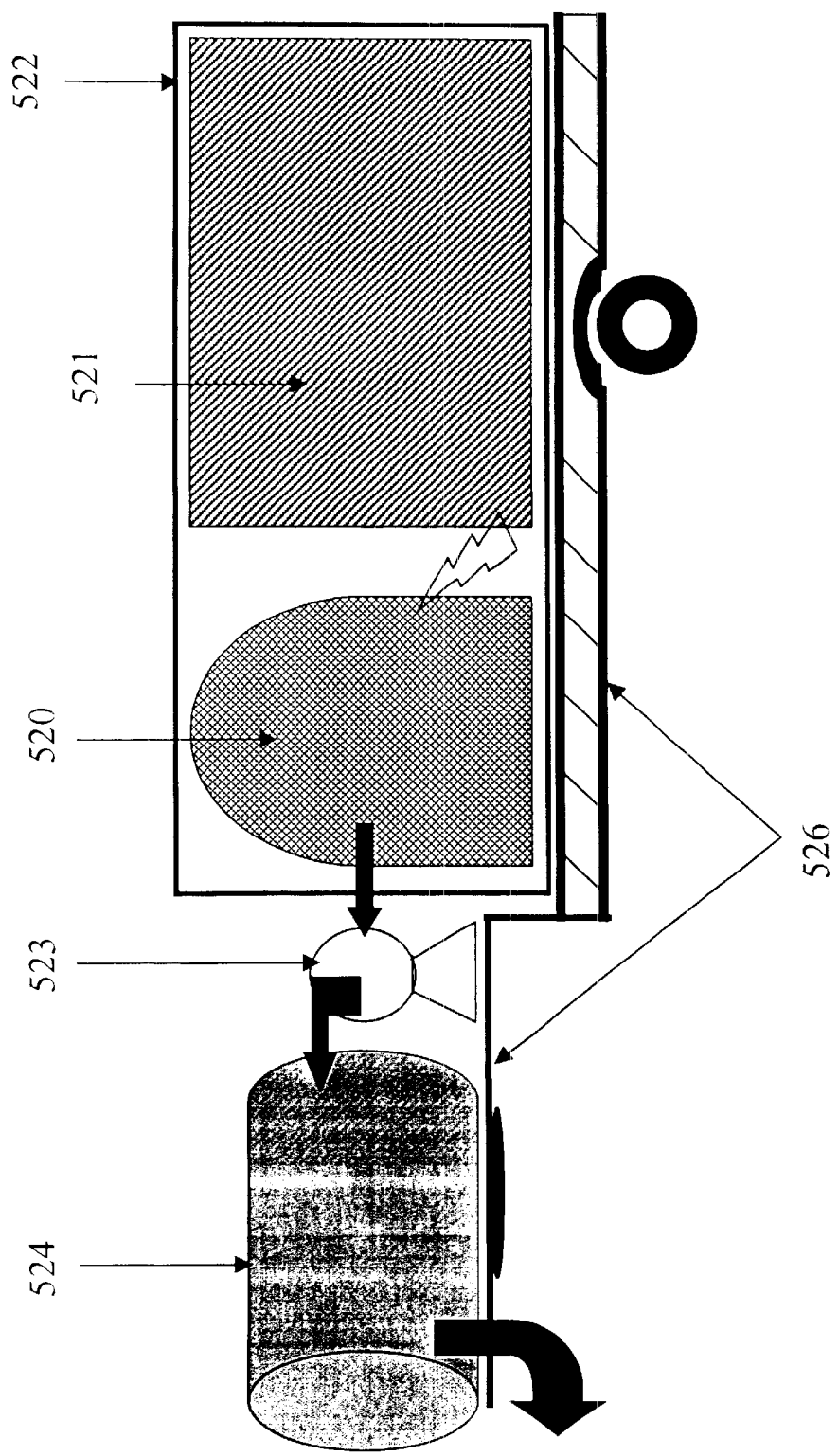
FIG. 10 shows a schematic of an implementation of a system for continuous supply of freshwater to a large group of consumers.

There is no limitation on the size of the condensation unit, and hence large units can be provided for supply of large groups, or large buildings of water in situations of emergency, such as the apparatus in the embodiment of FIG. 10, wherein the system is mounted on a trailer 526 to be towed or pulled by a conventional cab. The trailer 526 is about 10 meter long and has a raised front to be hitched to the cab. To be placed on the raised front is a product water tank 524 of capacity up to 4 cubic meter of water, made of fiberglass or equivalent. The height of the whole setup on the trailer will be such that transportation of the apparatus will be possible for crossing under overpasses and bridges. In the implementation of this aspect of the invention a condensation unit 520 capable of producing 3 to 4 cubic meter of freshwater per day can be used such as Dry-air dehumidifier produced by Environmental Pool Systems, Inc., Waterford, Michigan or equivalent; weighing about 3 tons. The electric power is supplied by a diesel generator 521, with a generation capacity of 175 kW to 200 kW electric, such as Caterpillar or equivalent, weighing about 3.5 tons. The condensation unit and the diesel generator are skid-mounted and placed in a container 422, with provisions for a strong stream of airflow from the outside and openings and blowers for escape of exhaust air. The container 422 is designed for loading and unloading the condenser generator set. Space is provided in the container 422 for accessories for product water treatment, cooling and supply of diesel fuel, connections, etc. Condensate is pumped from an intermediate collection tank to the Main holding tank 524 by pump 423. The water product can be pumped to a storage tank on the roof of a building to supply the dwellers with sufficient water for a period. The apparatus can be used to supply water to large crowds in festivals and pilgrims in Makkah or during natural disasters. The apparatus can continuously provide freshwater to a caravan or troops during long trips.

Figure 11:
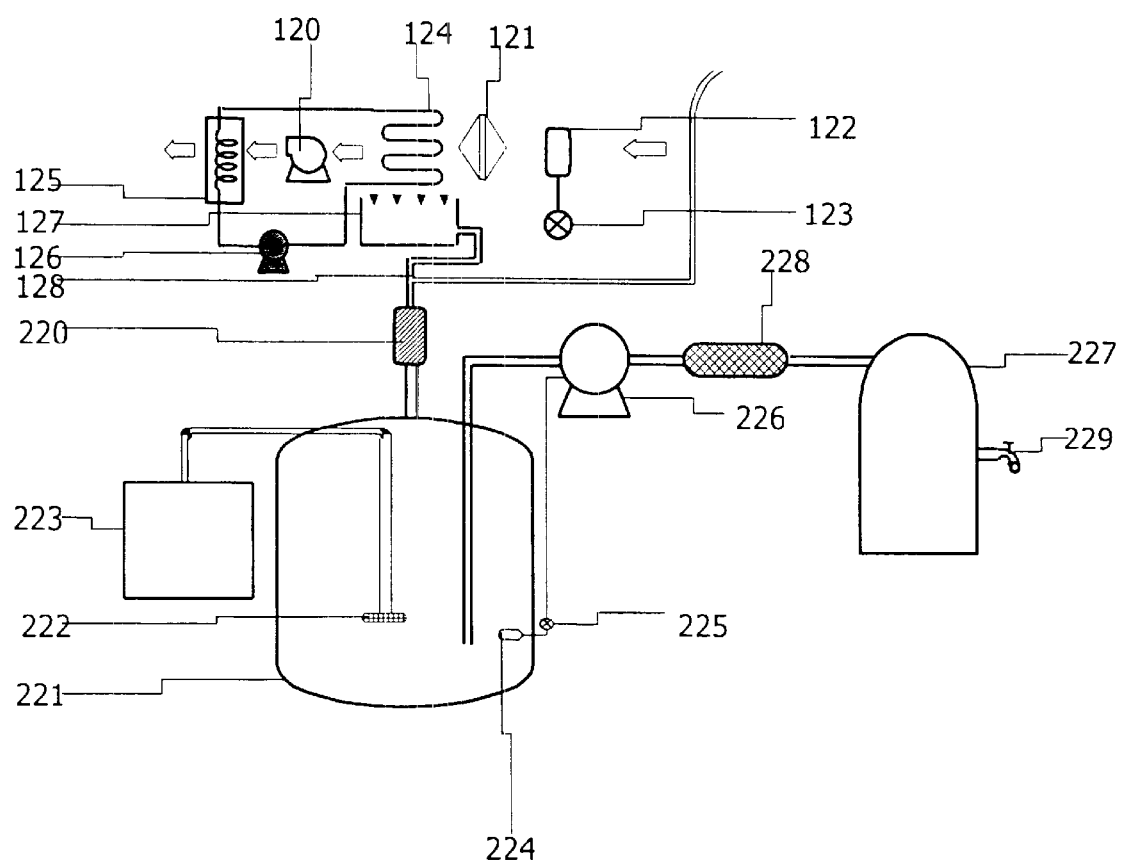
FIG. 11 shows the components of an apparatus for production of large quantities of drinking water, wherein a special condensation unit is used to condensate water vapor from the surrounding hot and humid air, pumps are used for water flow and ozone is used to disinfect the water before supply to the consumer.

FIG. 11 presents an apparatus for production of drinking water from the atmosphere, wherein hot and humid air is directed by an air suction fan 120 to pass through an air filter 121, which is commonly used in central air conditioning systems, for purification of air from fine sand and dust, and volatile organic particulates.

To reduce the electric power consumption, a unit is provided to interrupt the operation of the apparatus when the combination of the temperature and the relative humidity of the surrounding air are such that the process of water extraction from the atmosphere becomes uneconomical. The limit at which the apparatus is shut down is determined by the concentration of moisture in the air. When such concentration drops the operation stops until the absolute humidity goes up again. The operation control is achieved by a controller 122 fitted with a sensor that determines the instantaneous absolute humidity by measuring the temperature and the relative humidity of the surrounding air as it is drawn to the inlet of the apparatus. The controller 122 is calibrated and set at a limit above, which the apparatus should operate. When the absolute humidity drops under the predefined limit the operation is interrupted through the circuit breaker 123. Instead of sensing the temperature and the relative humidity, a device can be used to directly sense the absolute humidity of the surrounding air; however, such type of instrument is costly.

The water vapor condensation in the invention of FIG. 11 is achieved by a specially designed unit using a refrigerant and comprises a set of coils 124 with cooling fins that condenses water vapor from the incoming air. The heat transferred from the air causes the refrigerant to evaporate and flow to the refrigerant condenser 125 and then to the refrigerant compressor 126 where it is driven back to the refrigerant evaporator coils 124 to collect more moisture from the hot humid air. As the air flows through the coils and passes by the surface of the fins, of the refrigerant evaporator 124, the heat from the air is transferred to the coils and freshwater droplets form on the colder surfaces. The fan 120 cools the refrigerant condenser 125 with the dry cooler air as it exits the water condensation stage. The dry air exits at a relatively high temperature.

In the apparatus of FIG. 11, the condensate is collected in container 127 from which it flows by gravity through the tube 128 that directs the collected water to a preliminary filter 220 and then to the intermediate water tank 221 after removal of the suspended contaminants from the water condensation surfaces 124 and the container 127. The water accumulates in tank 221 until it is filled and the water is treated by a charge of ozone that enters from a stone distributor 222 supplied with ozone from an ozone generator 223 that generates ozone from the air. When the tank 221 is empty or when the water level is low, the float 224 sends a signal to an electronic controller 226 that interrupts the operation of the water pump 227. When the tank is refilled above a specified limit, the water pump 227 drives the water at a moderate flow rate to prevent gushing of the water to the cooler 227 and to provide enough time for the final filter 228 to eliminate residual ozone, precipitate harmful minerals and remove oxidized bacteria and organic contaminants from the water stream. The water can then be dispensed from the faucet 229.

Water production will increase as the condensation surface of the coil and fins 124 increases. Assuming the rate of condensation is 1.2 liter per square meter per day on the average and that the rate increases linearly with the surface area of the water condenser, doubling the surface area will double the production rate. That is a daily production of 38 liters is possible if the condensation surface area is double that of the apparatus of FIG. 1. Using the minimum and maximum temperature and humidity observed at the Weather Station in Mudaylif, Saudi Arabia, the apparatus can produce freshwater at a daily rate between 23 liters and 78 liters, according to Table 1.

Figure 12:
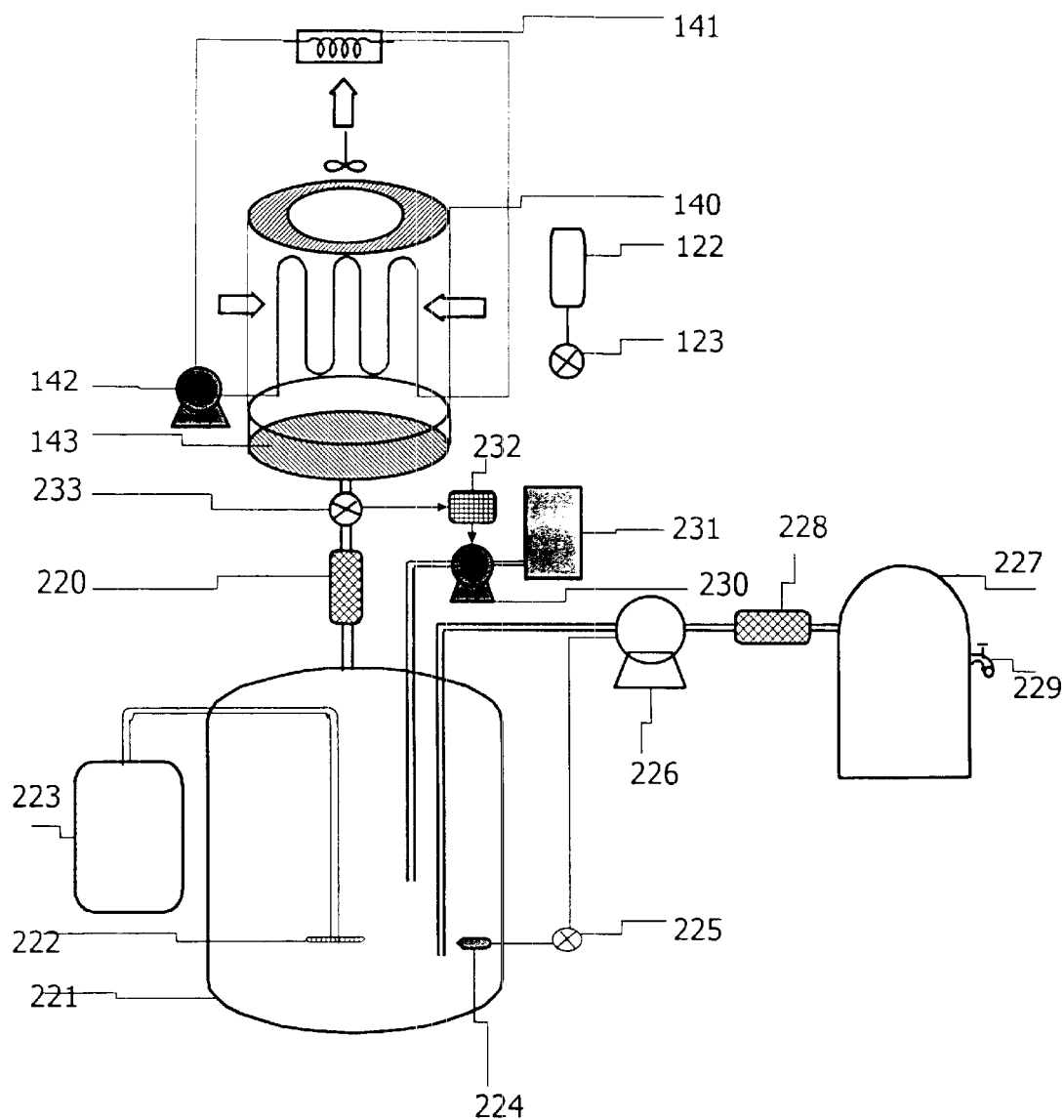
FIG. 12 shows a high capacity version of the apparatus in FIG. 11 wherein a circular condenser is used to increase water production and minerals are added to improve the taste of the product water.

In FIG. 12, a circular water condenser (refrigerant evaporator) 140 is used to increase the rate of water production since the surface area exposed to the hot humid air is much larger than that of the rectangular condenser 124 of FIG. 11. In addition, the design of the water condenser coils exposes the manifold of the condensation surfaces to the hot humid air. The components of the water condensation cycle of the apparatus of FIG. 12 comprises a refrigerant condenser 141, a compressor 142 and a container 143 to collect the condensate. The container 143 is open to the atmosphere, which eliminates the intrusion of the volatile organic particulates in the water stream and balances the pressure in the apparatus allowing flow of water by gravity.

To add minerals to the drinking water from the saline solution tank 231, a dosing pump 232 dispenses of measured amounts of minerals. The mineral addition is controlled by the flow meter 232 that measures the water addition to the tank 221. The flow meter 232 is connected to a valve 233. All other components remain the same as in that of the apparatus of FIG. 11.

A water cooler may be used in place of the tank 221 before the filter 228 wherein ozonation can take place. Ozonation of cold water is more effective than in warm water. In this case, the cooler 227 is replaced by an insulated cold-water tank. However, the electric power for cooling the tank 221 will be higher.

Alternately the cooler 227 can be replaced by a water tank, if dispensing of warm water in place of cold water is desired.

Furthermore, water-cooling can be achieved by conventional refrigeration cycles using CFC refrigerants or by thermo-acoustic cooling.

While the present invention has been described with references to several embodiments, it will be appreciated by those skilled in the art that the invention may be practiced otherwise than as specifically described herein without departing from the spirit or the scope of invention. It is, therefore, to be understood that the spirit and scope of the invention be limited only by the appended claims.

What is claimed is:

1. An apparatus for the production of freshwater and drinking water by condensation of water vapor from high temperature, high humidity ambient air comprising:
   a housing;
   condensation means for condensing water vapor entrained in humid and high temperature ambient air;
   initial transportation means for transporting by gravity the condensate from said water condensation means;
   vent means for facilitating water flow in said apparatus by gravity under ambient pressure;
   water preparation means for preparing the water for drinking;
   water distribution means for distributing drinking water from said water preparation means by gravity;
   first control means for controlling the operation of said condensation means; and
   electric means for supplying electric power to operate said condensation means.

2. The apparatus of claim 1, wherein said condensation means comprises:
   an air drying unit that operates by a conventional refrigeration cycle using a refrigerant, wherein said air drying unit draws humid and high temperature ambient air from a surrounding environment in an effort to dry said humid and high temperature ambient air in a limited space and exhaust dry air to the outside;
   adjusting means for controlling the flow of said humid and high temperature ambient air inside the said air drying unit;
   open means for allowing free falling condensate droplets from said air drying unit such that the condensate droplets do not trap volatile organic particulates;
   collecting means for receiving and collecting by gravity said condensate droplets from said open means; and
   second control means for controlling said air drying unit.

3. The apparatus of claim 2, wherein said control means comprises:
   first circuit breaker means for interrupting the electric current supplied to said air drying unit;
   pressure means for actuating said first circuit breaker means when said collecting means is filled with condensate in an effort to stop said air drying unit and avoid an overflow of condensate inside side collecting means;
   lifting means for lifting said collecting means such that physical contact between said collecting means and said first circuit breaker means is avoided when said collecting means is filled with condensate;
   first sensor means fastened to said collection means;
   floating means that floats on the surface of condensate collected in said collection means in a manner such that said it contacts said first sensor means when the water level in said collection means reaches a preset level to interrupt the electric current supplying said air drying unit; and
   isolation means for preventing said floating means from contacting said first sensor means at any time.

4. The apparatus of claim 1, wherein said water preparation means comprises:
   disinfection means for removing microorganisms and organic and inorganic contaminants from water flowing by gravity from said initial transportation means;
   intermediate water transportation means for transferring disinfected water from said disinfection means; and
   filtration means for removing suspended contaminants and particulates from disinfected freshwater and produce drinking water.

5. The apparatus of claim 4, wherein said disinfection means comprises:
   a disinfection chamber through which water flows by gravity from said collection means; and
   an ultraviolet source that emits continuous ultraviolet light to expose the water in said chamber to ultraviolet radiation to kill the microorganisms and oxidize the majority of organic and inorganic contaminants present in the water.

6. The apparatus of claim 4, wherein said filtration means comprises:
   a filtration column comprising a mixture of activated carbon and ion exchange resin to clarify disinfected water from organic and inorganic particulates and oxidized waste from flowing from said disinfection means and to improve water taste; and
   third water transportation means for transferring filtered water by gravity.

7. The apparatus of claim 1, wherein said water distribution means comprises:
   storage means for storing drinking water;
   overflow prevention means for preventing the overflow of water in said storage means; and
   water drawing means for dispensing water on demand from said storage means by gravity.

8. The apparatus of claim 7, wherein said overflow prevention means comprises:
   second sensor means fastened to said storage means;
   a level floating means that floats at the surface of the drinking water in said storage means, said level floating means contacting said second sensor means when the water level in said storage means reaches a preset level; and
   second circuit breaker means for interrupting a electric current supplied to said electric means when said level floating means contacts said second sensor means.

9. The apparatus of claim 7, wherein said water drawing means comprises a faucet to provide the user with drinking water at ambient temperature on demand.

10. The apparatus of claim 9, further comprising a filling means for filling containers with drinking water produced by said apparatus.

11. The apparatus of claim 7, wherein said water drawing means comprises:
    an ultraviolet sterilization means for sterilizing product water;
    a polishing filter for retaining sterilization solid waste from sterilized product water; and
    a faucet to provide the user with sterilized pyrogen-free water at ambient temperature on demand, for medical usage.

12. The apparatus of claim 1, wherein said water distribution means comprises:

first transfer means for transferring drinking water by gravity;

drawing means for drawing drinking water from said main drinking water storage means on demand by gravity;

first directing means for directing the flow of access water from said main drinking water storage means;

secondary storage means for storing drinking water, having the same capacity as said main drinking water storage means;

secondary directing means for directing the flow of access water from said secondary drinking water storage means; and access water transport means for transporting the drinking water outside said apparatus proper by gravity and including a pipe for transporting drinking water outside said apparatus proper by gravity and a replaceable water tank.

13. The apparatus of claim 1, wherein said freshwater transport means comprises:

flow means to allow flow of freshwater by gravity from said collection means;

diversion means for diverting freshwater from flowing to said water preparation means and directing it to said flow means;

a mobile water tank for storage of freshwater;

second transfer means for transferring freshwater to said mobile water tank; and access water drainage means for draining access freshwater for different uses.

14. The apparatus of claim 13, wherein said access water drainage means comprises:

second directing means for directing access freshwater by gravity;

fourth transport means for transporting access water outside said apparatus; and external flow means for directing access water for desired use outside of said housing.

15. An apparatus for producing freshwater and drinking water from high temperature, high humidity atmospheric air flowing by natural air convection inside an area comprising:

condensation means, contained within a box with inlet air ducts and outlet air ducts for passage of a directed draft of high temperature, high humidity ambient air; and including a cold condensation surface for producing water condensate from water vapor contained in said high temperature, high humidity ambient air when said high temperature, high humidity ambient air is in contact with said cold condensation surface, said water condensate falling by gravity to a condensate collection means;

an air blowing means for creating a turbulent flow of high temperature, high humidity ambient air through said inlet air ducts of said condensation means;

an air directing means for drawing high temperature, high humidity ambient air blown by said air blowing means through said inlet ducts after filtering by an air filter means, and for directing said high temperature, high humidity ambient air to flow inside said condensation means to cool and dry in contact with said cold condensation surface and exit as dry air out of said outlet air ducts;

a freshwater directing means for directing the flow of freshwater from said condensate collection means to two streams, a first stream for supply of freshwater and a second stream for processing of potable water;

a freshwater supply means to supply said first freshwater stream to users;

a potable water processing means to process said second potable water stream;

a potable water dispensing means to supply potable water to users on demand;

a pressure balance means to allow water to flow by gravity throughout said apparatus; and an electric means to supply of electric power to operate said apparatus.

16. The apparatus of claim 15, wherein said condensation means comprises a conventional refrigeration cycle using a refrigerant.

17. The apparatus of claim 16, wherein said conventional refrigeration cycle comprises a large capacity commercial dehumidifier for drying of ambient air in closed spaces.

18. The apparatus of claim 16, wherein said conventional refrigeration cycle comprises:

a compressor means to compress said refrigerant in gaseous form;

a condenser means to condense said refrigerant gas;

a cooling means to cool said condenser means;

a control means to adjust the flow of, and replenish said refrigerant; and an evaporation means to transfer heat from said high temperature, high humidity ambient air to said cold condensation surface to said refrigerant in liquid form to heat it and evaporate it; said cold condensation surface is specially designed and manufactured to provide a large surface contact with said high temperature, high humidity ambient air to condensate the largest possible quantity of water-vapor from said high temperature, high humidity ambient air.

19. The apparatus of claim 16, wherein said evaporation means comprises:

a metallic flat surface formed from a flat thin sheet and dense multitude of fins forming the largest possible condensation surface that can occupy a limited space wherein said high temperature, high humidity ambient air blows after being forced to enter said condensation means from said inlet air ducts and flow in contact with said metallic flat surface; and a bundle of closely packed connected coils in union with said metallic flat surface, through which said refrigerant flows under high pressure, and the finishing of the surface of said union promotes drop wise condensation of said water vapor entrained in said high temperature, high humidity ambient air as it passes in contact with the surface of said union causing the condensate to flow by gravity into said condensate collection means.

20. The apparatus of claim 16, wherein said evaporation means comprises:

a vertically oriented metallic cylindrical surface formed from a thin sheet and dense plurality of fins forming the largest possible condensation surface that can occupy a limited space wherein said high temperature, high humidity ambient air blows after being forced to enter said condensation means from said inlet air ducts and flow in contact with both sides of said vertical metallic cylindrical surface; and a bundle of closely packed connected coils, through which said refrigerant flows under high pressure, said bundle of closely packed coils is in union with said metallic cylindrical surface, and the finishing of the surface of said union enhances drop wise condensation of said water vapor entrained in said high temperature, high humidity ambient air as it passes by the surface of said union of vertical structure and causes the condensate to fall freely into said condensate collection means.

21. The apparatus of claim 15, wherein said condensation means comprises
   a thermo-acoustic refrigeration unit; using air as refrigerant, cooling a stream of fresh water flowing through a first group of coils, and then pumped for forced circulation in a second group of packed water tubing in the form of coils;
   a first flat metallic surface forming an integral structure with said first group of coils, the finishing of the surface of said structure enhances drop wise condensation of water vapor entrained in said high temperature, high humidity ambient air and causes the condensate to flow to said condensate collection means; and
   a second flat metallic surface forming with said second group of coils a second integral structure, the finishing of which enhances drop wise condensation of water vapor entrained in said high temperature, high humidity ambient air as it passes by said second integral structure and causes the condensate to flow to said condensate collection means.

22. The apparatus of claim 15, wherein said control means comprises:
   an absolute humidity measurement means to determine the absolute humidity of said high temperature, high humidity ambient air at said inlet air ducts of said condensation means;
   a calibrated limiting means set at a predetermined limit of absolute humidity at which the water-vapor condensation process should stop; and
   an integrated circuit to control the operation of said condensation means; said air blowing means; and said air directing means shutting off their electric supply whenever the absolute humidity indicated by said absolute humidity measurement means goes below the predetermined limit specified by said calibrated limiting means, and starting the said electric supply system, once the absolute humidity indicated by said absolute humidity measurement means reaches or goes above the said predetermined limit.

23. The apparatus of claim 15, wherein said control means comprises:
   a temperature sensor means to measure the temperature of said high temperature, high humidity ambient air at said inlet air ducts of said condensation means;
   a relative humidity sensor means to measure the relative humidity of said high temperature, high humidity ambient air at said inlet air ducts of said condensation means;
   an absolute humidity indication means to use the reading of said temperature sensor means and said relative humidity sensor means to determine the water vapor content of said hot humid ambient air at said inlet air ducts of said condensation means;
   a temperature calibrated scale means to display an ambient air temperature limit above which the absolute humidity is high enough to make the water-vapor condensation economically feasible, said temperature calibrated scale means is connected to said temperature sensor means, said relative humidity sensor means, and said absolute humidity indication means; and
   an electronic switching circuit activated by said temperature calibrated scale to shut off the electric supply of said condensation means; said air blowing means; and said air directing means whenever the ambient air temperature drops below the said limit specified by said temperature calibrated scale, and starting said electric supply, once the ambient air temperature reaches or goes above said limit.

24. The apparatus of claim 15, wherein said freshwater supply means comprises:
   a freshwater drawing means to draw the first freshwater stream from said freshwater directing means;
   a holding tank means to store freshwater; and
   an on-demand faucet means to supply users with freshwater on demand.

25. The apparatus of claim 24, further comprising removable water storage bottles to be filled by said on-demand faucet means whenever needed.

26. The apparatus of claim 24, wherein said freshwater drawing means further comprising an activated carbon filter means for removal of suspended particles from the freshwater stream drawn from said freshwater directing means.

27. The apparatus of claim 24, wherein said holding tank means further comprising a means for precipitation and removal of solid particulates before dispensation through said on-demand faucet means.

28. The apparatus of claim 15, wherein said freshwater supply means comprises:
   a freshwater drawing means to draw the first freshwater stream from said freshwater directing means;
   an open spout means;
   removable freshwater storage bottles to be filled by said open spout means whenever needed; and
   an open tank means to be fed by said open spout means with a continuous freshwater supply for use by animals for drinking or in small scale plant watering.

29. The apparatus of claim 15, wherein said potable water processing means comprises:
   a treatment means to remove contaminants from the second freshwater stream from said freshwater directing means, to assure the safety of potable water before dispensation to the consumers;
   a main potable water holding tank to store water flowing from said preliminary treatment means;
   a taste enhancement means to improve the taste of potable water and enhance its benefits; and
   a dispensation means to supply potable water to consumers on demand.

30. The apparatus of claim 29, wherein said treatment means comprises:
   a disinfection means for removal of microorganisms;
   a filtering means to filter dust, sand and suspended particulates; and
   a means to enhance precipitation of suspended particulates in said main potable water holding tank.

31. The apparatus of claim 30, wherein said disinfection means comprises:
   a preliminary disinfection chamber through which the second freshwater stream flows by gravity from said freshwater directing means for processing of potable water;
   a preliminary disinfection ultraviolet source to radiate on the freshwater in said preliminary disinfection chamber to remove microorganisms and oxidize organic particulates;

a final disinfection chamber for the water flow to said dispensation means; and a final disinfection unit providing ultraviolet radiation on water flowing through said final disinfection chamber to further remove microorganisms and oxidize organic particulates contained in the water as it flows through piping and contained in said main potable water holding tank before supplying the potable water to consumers.

32. The apparatus of claim 30, wherein said disinfection means comprises:

an air pump to collect and supply ambient air to an ozone generator and pumps ozone through an air piping means to said main holding tank;

a dispersing means to release ozone gas and distribute it in said main holding tank; and a means to release residual ozone from said main holding tank.

33. The apparatus of claim 30, wherein said disinfection means comprises:

a chlorine storage means;

a water flow measurement means to monitor the movement of drinking water from said main holding tank;

a dosing pump to release chlorine spikes into said main holding tank according to a predetermined dosage of chlorine in proportion to the water flow measured by said water flow measurement means, said dosing pump substantially eliminating microorganisms forming within and intruding from outside of said main holding tank, said predetermined dosage of chlorine addition being determined by water standards in the country of use or by World Health Organization standards; and a means to dispose of the exhaust of chlorine from said main holding tank.

34. The apparatus of claim 30, wherein said filtering means comprises:

a preliminary filter to hold sand and dust that escape said air filter means and suspended particulates released by erosion and corrosion during the condensation of water vapor;

a final polishing filter to filter the sediments from water disinfection and suspended particulates released by erosion and corrosion during the flow of water in connection pipes.

35. The apparatus of claim 24, wherein said preliminary filter comprises a filtration column containing a mixture of ion exchange resin and activated carbon.

36. The apparatus of claim 34, wherein said preliminary filter comprises a plurality of cation exchange, anion exchange and activated carbon columns.

37. The apparatus of claim 15, wherein said potable water taste improvement means comprises:

an aeration means to bubble air in the potable water stored in said main holding tank; and a mineral dosing unit to add beneficial minerals to the potable water stored in said main holding tank.

38. The apparatus of claim 37, wherein said aeration means comprises:

an air filtration means to filter inlet air;

an air blower means to pump air into said main holding tank;

an air dispersion means to release incoming filtered air from said air blower means into said main holding tank as a continuous stream of bubbles; and a vent means for release of bubbled air from said main holding tank.

39. The apparatus of claim 37, wherein said aeration means comprises:

an air filtration means to filter inlet air;

an air blower means;

an oxygen separator to extract oxygen from ambient air;

an oxygen pump to drive oxygen into said main holding tank;

an oxygen dispersion means to release oxygen from said oxygen pump into said main holding tank as a continuous stream of oxygen bubbles; and a vent means for release of bubbled oxygen from said main holding tank.

40. The apparatus of claim 37, wherein said mineral dosing unit comprises:

a conductivity sensor to determine the conductivity of the potable water stored in said main holding tank and to indicate the mineral content in said potable water;

a calibrated conductivity means to fix the level of concentration of natural minerals required and to adjust the mineral content in the potable water;

a mineral storage means to store a concentrated solution of natural minerals for addition to the potable water;

a needle valve to release droplets of said mineral solution into said main holding tank from said mineral storage means;

a dosing pump to deliver doses of said mineral solution through said needle valve according to the mineral concentration level fixed by said calibrated conductivity means; and a control means to control the flow of said mineral solution through said needle valve to said main holding tank.

41. The apparatus of claim 15, wherein said potable water processing means comprises:

a fluoride addition means to add fluoride to the potable water;

a cooling means to supply cold potable water; and a carbonated water production means to supply cold carbonated potable water.

42. The apparatus of claim 41, wherein said fluoride addition means comprises:

a fluoride storage means;

a water flow measurement means to monitor the movement of drinking water from said main holding tank;

a means to pump a pre-measured quantity of fluoride in said main holding tank proportionate to fresh water addition to said main holding tank according to the reading of said water flow measurement means of potable water movement; said pre-measured quantity of fluoride addition is determined by water standards in the country of use or by World Health Organization standards; and a release means to dispose of fluoride residuals from said main holding tank.

43. The apparatus of claim 41, wherein said cooling means comprises:

a water cooler to supply the user with cold potable water, said water cooler is a thermoelectric cooler;

a water pumping means for increasing the pressure of the dispensing of potable water, said water pumping means connected between said main holding tank to said water cooler;

a water flow control means to adjust the flow of potable water to said water cooler; and an excess flow means to prevent the overflow of water.

44. The apparatus of claim 41, wherein said cooling means comprises:

a heat transfer means to decrease the temperature of the potable water stream;

a heat sink to accumulate the heat withdrawn from the potable water stream; and a heat exchange means to use the heat from said heat sink to heat a portion of the potable water stream to supply hot water.

45. The apparatus of claim 41, wherein said carbonated water production means comprises:

a carbon dioxide storage means to store carbon dioxide under pressure;

a control means to control the release of carbon dioxide from said carbon dioxide storage means;

a meter pump to release the carbon dioxide in the cold potable water stream on demand; and a mixer means to mix carbon dioxide with the cold potable water stream on demand.

46. The apparatus of claim 15, wherein said on demand potable water dispensing means comprises:

a warm water dispensing means to dispense on demand potable water at ambient temperature;

a hot water dispensing means to dispense on demand hot potable water;

a cold water dispensing means to dispense on demand cold potable water; and a carbonated dispensing means to dispense on demand cold carbonated potable water.

47. The apparatus of claim 15, wherein said on demand potable water dispensing means further comprises:

an ultraviolet sterilization means for sterilizing product water;

a polishing filter for retaining sterilization solid waste from said product water; and a faucet to provide the user with sterilized pyrogen-free water at ambient temperature on demand for medical uses.

48. The apparatus of claim 43, wherein said excess flow means comprises:

a diversion means of accumulated cold water using a diversion pump to drive cold water through a first plurality of auxiliary coils within the housing of said condensation means;

a first set of finned surfaces fixed on said first plurality of coils to enhance water vapor from said high temperature and high humidity ambient air during periods of excess accumulation of cold water;

a means of directing high temperature and high humidity ambient air within the housing of said condensation means to blow over said first set of finned surfaces;

a second plurality of auxiliary coils within the housing of said condensation means;

a second set of finned surfaces fixed on said second plurality of coils to enhance water vapor from said high temperature and high humidity ambient air during periods of excess accumulation of cold water;

a means of directing hot humid ambient air blowing over said first set of finned surfaces to blow over said second set of finned surfaces;

a connection means to connect the water outlet of said first plurality of coils to the water inlet of said second plurality of auxiliary coils; and a return means to return the water exiting said second plurality of auxiliary coils to the water line fed by said water pumping means, said exiting water being filtered and returned to the said water cooler.

49. The apparatus of claim 15, wherein said pressure balance means comprises a plastic tube placed at a position above said condensate collection means to allow the water to fall by gravity into said main holding tank.

50. The apparatus of claim 15, wherein said electric means comprises an electric connection means for supplying electric power to said apparatus from a central power supply system.

51. The apparatus of claim 15, wherein said electric means comprises an electric power supply means.

52. The apparatus of claim 51, wherein said electric power supply means comprises a diesel generator producing alternate current.

53. The apparatus of claim 51, wherein said electric power supply means comprises rechargeable batteries for producing direct current and a rectifier for converting direct current into alternate current.

54. An apparatus for condensing atmospheric humidity of high temperature and high humidity air to provide potable water to a small group of people, said condensing apparatus comprising:

a modified dehumidifier unit for drying of indoor air, said modified dehumidifier unit is complete with inlet air ducts, outlet air ducts, a fan to draw humid air in through said inlet air ducts and exhaust dry air out through said outlet air ducts to the atmosphere, a water vapor condensing surface, an air filter on said inlet air ducts to filter oncoming ambient air, and a drain for draining water condensate at the bottom of said modified dehumidifier unit;

an air blower to direct a strong stream of hot humid ambient air inside said modified dehumidifier unit through said inlet air ducts, said air blower having a controller for automatically cutting off power to said air blower according to conditions determined by the absolute humidity of said high temperature and high humidity ambient air;

a condesate collection means for collecting the condensate drained from said drain of said modified dehumidifier unit;

a pump for moving the water in said condesate collection means, said pump having a pump controller means for automatically shutting off power to said pump when the water level in said condensate collection means is below a predetermined limit and turning on the power to said pump when the water level in said condensate collection means is above said predetermined limit;

a disinfection means to disinfect the water flowing from said pump;

a filtration means for cleaning disinfected water from suspended;

a water holding tank for storing disinfected and filtrated potable water;

an aeration means for freshening the potable water stored in said water holding tank;

a dispensing means for dispensing the potable water stored in said water holding tank;

a drain means for directing potable water in excess of the capacity of said water holding tank; and an electric supply means for supplying electric power to said apparatus.

* * * * *